(12) United States Patent
Katsumata et al.

(10) Patent No.: US 7,198,376 B2
(45) Date of Patent: Apr. 3, 2007

(54) ILLUMINATION OPTICAL UNIT LIQUID CRYSTAL PROJECTOR AND PRODUCTION METHOD OF LIQUID CRYSTAL PROJECTOR

(75) Inventors: Masao Katsumata, Tokyo (JP); Tetsuro Okamura, Tokyo (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 10/362,334

(22) PCT Filed: Jun. 21, 2002

(86) PCT No.: PCT/JP02/06211

§ 371 (c)(1),
(2), (4) Date: Oct. 3, 2003

(87) PCT Pub. No.: WO03/001291

PCT Pub. Date: Jan. 3, 2003

(65) Prior Publication Data
US 2004/0046942 A1    Mar. 11, 2004

(30) Foreign Application Priority Data
Jun. 21, 2001 (JP) .............................. 2001-188303
Feb. 21, 2002 (JP) .............................. 2002-045224

(51) Int. Cl.
*G03B 21/20* (2006.01)
*G03B 21/28* (2006.01)
*H04N 5/74* (2006.01)
*G02F 1/00* (2006.01)
*G02F 1/1335* (2006.01)
*G02B 27/10* (2006.01)

(52) U.S. Cl. .................... 353/102; 353/37; 353/38; 353/99; 348/751; 348/761; 349/5; 349/95; 349/113; 359/622; 359/627; 362/268

(58) Field of Classification Search ................ 353/102, 353/38, 20, 37, 98, 99; 362/299, 300, 325, 362/335, 268; 348/744, 751, 761, 771; 349/5, 349/7–9, 95, 96, 113; 359/619, 621, 622
See application file for complete search history.

(56) References Cited

U.S. PATENT DOCUMENTS 5,046,838 A * 9/1991 Iwasaki ........................ 353/101

(Continued)

FOREIGN PATENT DOCUMENTS

JP          11-212023     *    8/1999

(Continued)

*Primary Examiner*—W. B. Perkey
*Assistant Examiner*—Rochelle Blackman
(74) *Attorney, Agent, or Firm*—Frommer, Lawrence & Haug LLP; William S. Frommer; Thomas F. Presson

(57) ABSTRACT

A lighting optical unit having an optical system for irradiating light from a light-source lamp on a predetermined object in a uniform and/or convergent manner includes a reflector for reflecting light from the light-source lamp to provide converged light and an optical assembly for collimating this converged light to provide a bundle of approximately parallel rays, wherein the bundle of approximately parallel rays is made to enter the optical systeml. Thus, in a liquid-crystal projector using a transmission type liquid-crystal panel with micro-lens, while a demand for increasing a quantity of light incident on an effective area of pixel of a liquid-crystal panel is being satisfied, the lighting optical unit can be made compact in size.

9 Claims, 15 Drawing Sheets

U.S. PATENT DOCUMENTS

| | | | |
|---|---|---|---|
| 6,120,153 A * | 9/2000 | Ohta | 353/31 |
| 6,246,526 B1 * | 6/2001 | Okuyama | 359/621 |
| 6,273,569 B1 | 8/2001 | Iechika et al. | 353/38 |
| 6,286,961 B1 * | 9/2001 | Ogawa | 353/38 |
| 6,464,362 B1 * | 10/2002 | Sugawara et al. | 353/102 |
| 6,796,654 B2 * | 9/2004 | Huang | 353/20 |

FOREIGN PATENT DOCUMENTS

| | | |
|---|---|---|
| JP | 2000-137204 | 5/2000 |
| JP | 2000-193926 | 7/2000 |
| JP | 2000-194068 | 7/2000 |

* cited by examiner

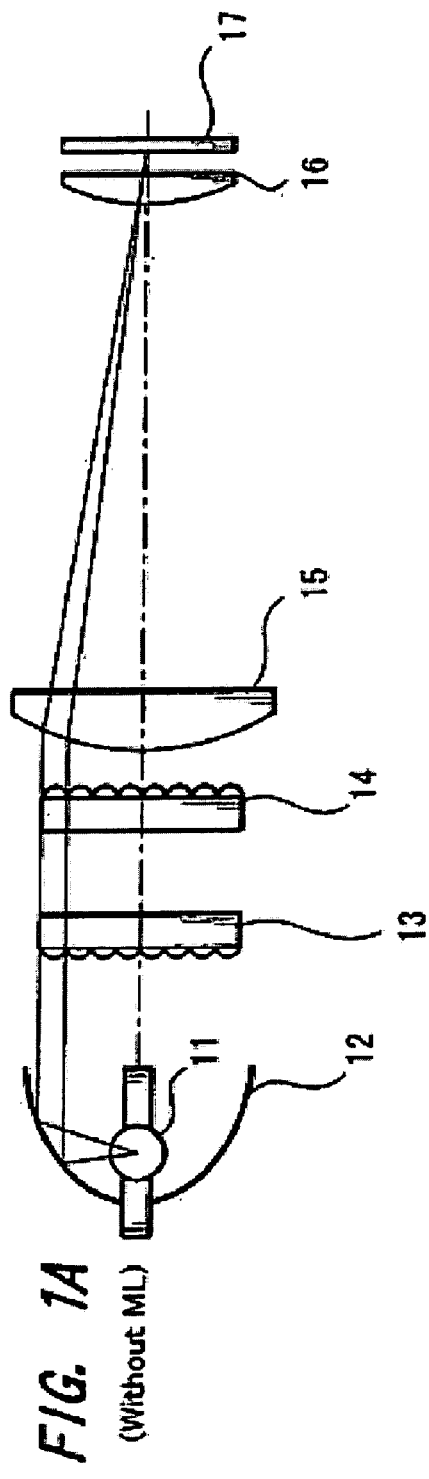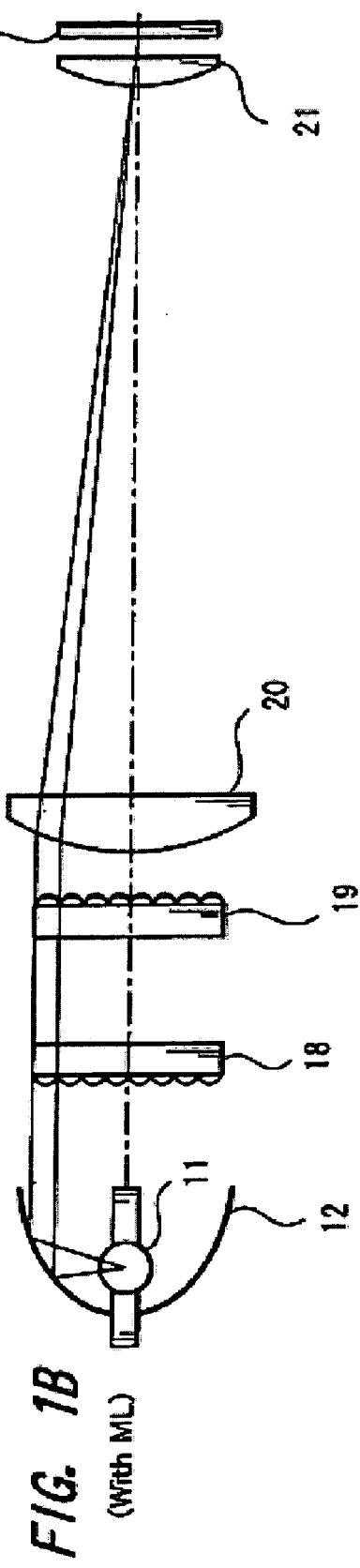
RELATED ART
FIG. 1A
(Without ML)
RELATED ART
FIG. 1B
(With ML)

FIG. 15A (Common to With ML And Without ML)
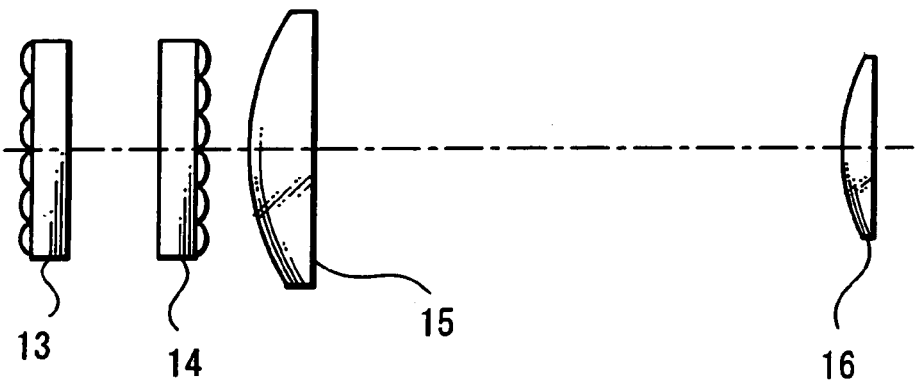
FIG. 15B (With ML)
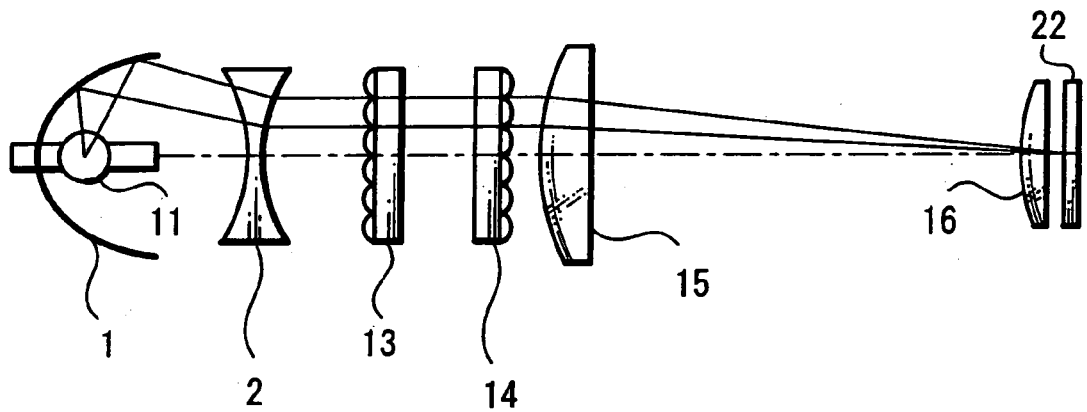
FIG. 15C (Without ML)
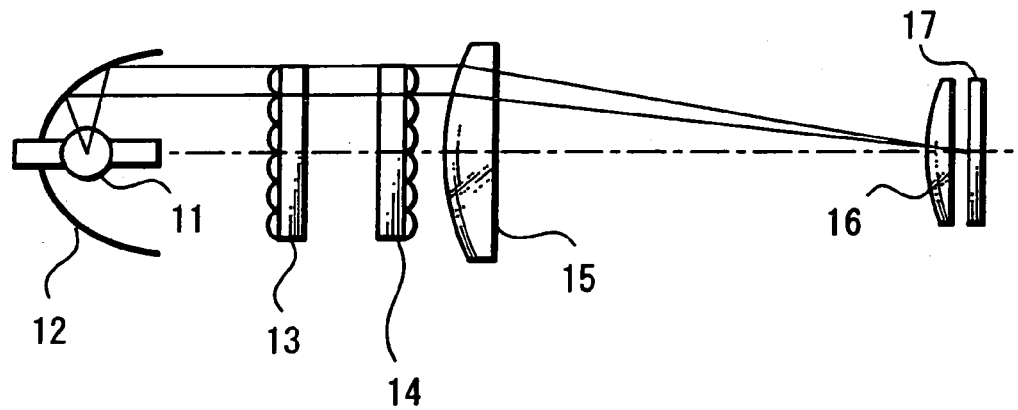

ILLUMINATION OPTICAL UNIT LIQUID CRYSTAL PROJECTOR AND PRODUCTION METHOD OF LIQUID CRYSTAL PROJECTOR

TECHNICAL FIELD

The present invention relates to a lighting optical unit, a liquid-crystal projector and a method of manufacturing liquid-crystal projectors.

BACKGROUND ART

In liquid-crystal projectors using a transmission type liquid-crystal panel as a light modulating element, there exists a liquid-crystal projector in which a micro-lens (hereinafter also described as "ML") is provided on the surface of a liquid-crystal panel corresponding to each pixel in order to increase a quantity of light incident on an effective area of pixel.

FIG. 1 is a diagram showing an example of a conventional arrangement of a main portion of a lighting optical unit in a liquid-crystal projector using a liquid-crystal panel with ML compared with a lighting optical unit of a liquid-crystal projector using a liquid-crystal panel without ML.

In the lighting optical unit of the liquid-crystal projector using the liquid-crystal panel without ML, as shown in FIG. 1A, light emitted from a light-source lamp 11 is reflected by a parabola-like reflector 12 to be collimated into a bundle of rays, and thereafter the light is made to be uniform by first and second fly-eye lenses 13, 14 (integrators for superimposing light at the central portion and light at the peripheral portion of the light-source lamp 11 so that light is uniformly irradiated on the liquid-crystal panel), converged by a main condenser lens 15 and channel condenser lens 16 and then irradiated on a liquid-crystal panel 17 without ML.

The optical system from the fly-eye lens 13 to the condenser lens 16 is designed and manufactured in such a manner that the system has a numerical aperture through which a quantity of light incident on the effective area of the pixel of the liquid-crystal panel 17 becomes approximately maximum and that the system has an entrance pupil diameter approximately equal to the diameter of a beam spot of a bundle of parallel rays from the reflector 12.

On the other hand, in the liquid-crystal projector using the liquid-crystal panel with ML, as shown in FIG. 1B, light from the same light-source lamp 11 as that in FIG. 1A is reflected by the same reflector 12 as that in FIG. 1A to be collimated into a bundle of parallel rays, and thereafter the light is made to be uniform by first and second fly-eye lenses 18 and 19, converged by a main condenser lens 20 and channel condenser lens 21 and then irradiated on a liquid-crystal panel with ML 22 (ML is provided on the surface of the liquid-crystal panel having the same structure as that of the liquid-crystal panel 17 shown in FIG. 1A).

The optical system from the fly-eye lens 18 to the channel condenser lens 21 is designed and manufactured such that the system may have a numerical aperture smaller than that of the optical system from the fly-eye lens 13 to the channel condenser lens 16 shown in FIG. 1A.

The reason for that will be described below. In the liquid-crystal projector having the lighting optical unit shown in FIG. 1A, when the liquid-crystal panel 17 is replaced with the liquid-crystal panel with ML 22, light refracted by the ML may be introduced into other portions than the effective area of the pixel of the liquid-crystal panel with ML 22. Therefore, there is a possibility that a quantity of light incident on the effective area will decrease. In order to prevent light refracted at the ML from entering into other portions than the effective area, a maximum conical angle of light incident on the liquid-crystal panel with ML 22 should be reduced. Thus, the optical system from the fly-eye lens to the channel condenser lens is designed and manufactured to have a small numerical aperture, thereby decreasing the maximum conical angle.

As described above, in the conventional liquid-crystal projector using the liquid-crystal panel with ML, as the optical system in the lighting optical unit for irradiating light from the light-source lamp on the liquid-crystal panel in a uniform and/or convergent manner (optical system from the fly-eye lens 18 to the channel condenser lens 21 in FIG. 1B), there has hitherto been designed and manufactured the optical system having the numerical aperture smaller than that of the liquid-crystal projector using the liquid-crystal panel without ML.

However, there are disadvantages in the prior-art technique as the following (a) to (c):

(a) In the liquid-crystal projector using the liquid-crystal panel with ML, when a numerical aperture of the optical system in the lighting optical unit for irradiating light from the light-source lamp on the liquid-crystal panel in a uniform and/or convergent manner is reduced, the F number of this optical system becomes large. Specifically, assuming that the F number of the optical system in the lighting optical unit of the liquid-crystal projector using the liquid-crystal panel without ML falls within a range of approximately 2.2 to 2.5, then the F number of the optical system in the lighting optical unit of the liquid-crystal projector using the liquid-crystal panel with ML becomes 3 or larger.

Consequently, in the liquid-crystal projector using the liquid-crystal panel with ML, as shown in FIG. 1B, since the optical path length of the lighting optical unit increases, the outside dimension of the lighting optical unit increases, and as a result the whole of the liquid-crystal projector may become large in size.

(b) When the liquid-crystal projector using the liquid-crystal panel with ML and the liquid-crystal projector using the liquid-crystal panel without Ml are both manufactured, as the optical systems in the lighting optical units, there should be designed and manufactured optical systems having different numerical apertures for both the optical system, respectively. Accordingly, even though the optical assemblies comprising the two optical systems have the same function (e.g. the fly-eye lens 13 in FIG. 1A and the fly-eye lens 18 in FIG. 1B), their specifications become different from each other.

Accordingly, since the optical assemblies cannot be made common to those optical systems, it is difficult to reduce costs of assemblies.

(c) When the liquid-crystal projector using the liquid-crystal panel with ML and the liquid-crystal projector using the liquid-crystal panel without ML are both manufactured, the arrangement operations for the optical systems in the lighting optical units should be carried out separately. Therefore, it is difficult to make a manufacturing operation more efficient.

In view of the aforesaid aspects, it is an object of the present invention to remove the disadvantages with respect to the conventional lighting optical unit of the liquid-crystal projector using the liquid-crystal panel with ML.

DISCLOSURE OF INVENTION

In order to solve these problems, the present application proposes, in a lighting optical unit including an optical system for irradiating light from a light-source lamp on a predetermined object in a uniform and/or convergent manner, the lighting optical unit including a reflector which reflects light emitted from a light-source lamp to provide converged light and an optical assembly which collimates this converged light to provide a bundle of approximately parallel rays, wherein this bundle of approximately parallel rays is made to enter this optical system.

In this lighting optical unit (first lighting optical unit according to the present invention), after light emitted from a light-source lamp has been reflected by the reflector and converted into converged light and then the converged light has been collimated by the optical assembly into a bundle of approximately parallel rays, this bundle of approximately parallel rays enters the optical system for irradiating light from this light-source lamp on an object in a uniform and/or convergent manner. Therefore, into this optical system there is introduced a bundle of rays whose diameter of beam spot is smaller than that of a bundle of rays obtained when light emitted from the light-source lamp is directly converted into a bundle of approximately parallel rays.

As a consequence, the object is irradiated with light in which a maximum conical angle of incident light is smaller than that obtained when light emitted from the light-source lamp is directly converted into a bundle of approximately parallel rays. Therefore, even when the entrance pupil diameter of this optical system is larger than the diameter of the beam spot of a bundle of approximately parallel rays entering this optical system (i.e. even when this optical system has a numerical aperture determined by this large entrance pupil diameter), an apparent numerical aperture of this optical system becomes small with respect to the object.

As described above, in this lighting optical unit, the apparent numerical aperture of the optical system for irradiating light from the light-source lamp on the object in a uniform and/or convergent manner becomes small with respect to the object irradiated with light.

Accordingly, even when the maximum conical angle of incident light should be made small with respect to this object, the optical system having the large numerical aperture may be designed and manufactured as this optical system.

Thus, it becomes possible to reduce the optical path length of the lighting optical unit by reducing the F number of this optical system.

Further, when the lighting optical unit for the object requiring a small maximum conical angle of incident light and the lighting optical unit for the object requiring a large maximum conical angle of incident light are both manufactured, as the optical systems, only an optical system having a large numerical aperture may be designed and manufactured and this optical system can be made common to both the optical systems in the two lighting optical units.

Therefore, if the above optical system is applied to the liquid-crystal projector, for example, using the liquid-crystal panel with ML, then the aforementioned disadvantages (a) and (b) can be removed.

In this lighting optical unit, when this optical system includes a first and a second fly-eye lenses for uniformly irradiating light from the light-source lamp on the object, the first fly-eye lens may be curved like a concave lens to serve as an optical assembly for converting converged light from a reflector into a bundle of approximately parallel rays as well.

Thus, the number of optical assemblies in the lighting optical unit can be reduced and it becomes possible to further shorten the optical path length of the lighting optical unit.

Further, in this lighting optical unit, the optical assembly for converting light from the reflector into a bundle of approximately parallel rays may be constructed as a glass curved as a concave lens attached to the reflector to cover the front of the light-source lamp.

Thus, it also becomes possible to further reduce the optical path length of the lighting optical unit.

Next, the present application proposes, in a lighting optical unit including an optical system having first and second fly-eye lenses for uniformly irradiating light from a light-source lamp on a predetermined object, the lighting optical unit comprising a reflector for reflecting light emitted from a light-source lamp to provide converged light and an optical assembly for diverging this converged light, wherein light from this optical assembly is made to enter this optical system and the position of the vertex of the lens cell of the first fly-eye lens is deviated from the center of the opening of the lens cell.

In this lighting optical unit (second lighting optical unit according to the present invention), after light emitted from the light-source lamp has been reflected by the reflector, converted into converged light and then diverged by the optical assembly, resultant light enters the optical system having the first and second fly-eye lenses for uniformly irradiating light from this light-source lamp on the predetermined object. The position of the vertex of the lens cell of this first fly-eye lens is deviated from the center of the opening of the lens cell.

In the aforementioned first lighting optical unit according to the present invention, the converged light from the reflector is collimated into the bundle of approximately parallel rays and then made to enter the optical system for irradiating light from the light-source lamp on a predetermined object in a uniform and/or convergent manner.

In order to collimate the converged light to provide the bundle of approximately parallel rays as described above, this converged light may be diverged by an optical assembly such as a concave lens (divergent lens).

However, it may be observed that converged light from the reflector can not be collimated into a bundle of highly paralleled rays due to aberration of the optical assembly, even though the optical assembly such as the concave lens that can diverge incident light is provided.

When the optical system for uniformly irradiating light from the light-source lamp on the predetermined object includes the first and second fly-eye lenses (integrators), if the bundle of parallel rays whose parallelism is not so high enters the opening portion of the lens cell of the first fly-eye lens, a quantity of light from the lens cell of the first fly-eye lens, which is incident upon the opening portion of the corresponding lens cell of the second fly-eye lens, may decrease, so that a quantity of light irradiated on the object decreases.

Further, as the optical system for uniformly irradiating light from the light-source lamp on the predetermined object, there exists an optical system further including in addition to the first and second fly-eye lenses a polarizing transducer element for transducing light from the second fly-eye lens into linearly-polarized light.

In the lighting optical unit including such optical system, when the optical assembly for diverging converged light from the reflector is provided, there is a possibility that, of light from the lens cell of the first fly-eye lens, a quantity of light incident on the opening portion of the polarizing transducer element may decrease due to the aberration of the optical assembly, so that a quantity of light irradiated on the object may also decrease.

As a method for preventing a quantity of light irradiated on an object from decreasing due to the aberration and for enhancing efficiency in utilizing light from a light-source lamp, there is known a method of providing a new optical assembly such as an aspherical lens to change the direction of light, thereby increasing a quantity of light incident on an opening portion of a lens cell of a second fly-eye lens and an opening portion of a polarizing transducer element.

According to this method, however, since the number of optical assemblies of the lighting optical unit increases and the optical path length of the lighting optical unit increases, the outside dimension of the lighting optical unit is caused to increase.

Hence, in the second lighting optical unit according to the present invention, converged light is diverged by an optical assembly such as a concave lens and made to enter the optical system for uniformly irradiating light from a light-source lamp on a predetermined object, and the vertex position of a lens cell of a first fly-eye lens of the first and second fly-eye lenses included in this optical system is deviated from the center of the opening of the lens cell, whereby the direction of light incident on the first fly eye-lens and the direction of light from the first fly-eye lens are changed (in other words, the first fly-eye lens has also a function of an aspherical lens and the like).

For example, when this optical system does not include the polarizing transducer element, the position of the vertex of the lens cell is made to deviate so that parallelism of light from the first fly-eye lens may be enhanced, whereby a quantity of light from the lens cell of the first fly-eye lens, which is incident on the opening portion of the corresponding lens cell of the second fly-eye lens may increase.

Alternatively, when this optical system includes the polarizing transducer element, the position of the vertex of this lens cell is made to deviate such that the direction of light from the lens cell may be directed toward the opening portion of this polarizing transducer element.

Thus, the optical path length can be reduced and the optical system can be made common in exactly the same manner as those in the aforementioned first lighting optical unit according to present invention; and decrease in a quantity of light irradiated on the object due to the aberration of the optical assembly that diverges converged light is prevented without increasing the number of optical assemblies and without causing the outside dimension of the lighting optical unit to increase, whereby efficiency in utilizing light from the light-source lamp is enhanced.

Next, the present application proposes, in a liquid-crystal projector including a light-source lamp, a transmission type liquid-crystal panel provided with micro-lenses corresponding to individual pixels and a lighting optical unit including an optical system for irradiating light from the light-source lamp on the transmission type liquid-crystal panel in a uniform and/or convergent manner, the liquid-crystal projector in which the lighting optical unit comprises a reflector for reflecting light from the light-source lamp to provide converged light and an optical assembly for collimating the converged light to provide a bundle of approximately parallel rays, wherein the bundle of approximately parallel rays is made to enter the optical system in the lighting optical unit.

In this liquid-crystal projector (first liquid-crystal projector according to the present invention), from exactly the same reason that has been set forth with respect to the aforementioned lighting optical unit according to the present invention, with respect to the liquid-crystal panel with ML, in the lighting optical unit the apparent numerical aperture of the optical system for irradiating light from the light-source lamp on the liquid-crystal panel with ML in a uniform and/or convergent manner can be made to decrease.

Therefore, even when this optical system is designed and manufactured to have a large numerical aperture, it becomes possible to prevent refracted light at ML of the liquid-crystal panel from entering other portions than the effective area of the pixel, thereby a quantity of light incident on the effective area increasing.

Thus, the F number of this optical system is made to be small and the optical path length of the lighting optical unit is shortened, whereby the aforementioned disadvantage (a) can be removed.

Further, when the liquid-crystal projector using the liquid-crystal panel with ML and the liquid-crystal projector using the liquid-crystal panel without ML are both manufactured, as the optical system, only the optical system having the numerical aperture through which a quantity of light incident on the effective area of the pixel of the liquid-crystal panel without ML becomes maximum can be designed, manufactured, and made common to both the liquid-crystal projectors, whereby the aforementioned disadvantage (b) can be removed.

Next, the present application proposes, in a liquid-crystal projector including a light-source lamp, a transmission type liquid-crystal panel provided with micro-lenses corresponding to individual pixels and a lighting optical unit including a optical unit having a first and second fly-eye lenses for uniformly irradiating light from the light-source lamp, on a predetermined object, the liquid-crystal projector comprising a reflector for reflecting light from the light-source lamp to provide converged light and an optical assembly for diverging the converged light, wherein light from the optical assembly is made to enter the optical system and the position of the vertex of a lens cell of the first fly-eye lens is deviated from the center of the opening of the lens cell.

According to this liquid-crystal projector (second liquid-crystal projector according to the present invention), from exactly the same reason that has been set forth with respect to the aforementioned second lighting optical unit according to the present invention, the optical path length can be shortened and the optical systems can be made common in exactly the same manner as those in the aforementioned first lighting optical unit according to present invention; and decrease in a quantity of light irradiated on the object due to the aberration of the optical assembly that diverges converged light is prevented without increasing the number of the optical assemblies and without causing the outside dimension of the lighting optical unit to increase (accordingly, without causing the whole of the liquid-crystal projector to become large in size), whereby efficiency in utilizing light from the light-source lamp can be enhanced.

Next, the present application proposes a manufacturing method for liquid-crystal projector comprising the steps of: disposing as an optical system in a lighting optical unit for irradiating light from a light-source lamp on a predetermined object in a uniform and/or convergent manner, an optical system including a numerical aperture through which a quantity of light incident on an effective area of pixel of a transmission type liquid-crystal panel without micro-lens becomes approximately maximum, disposing a reflector for reflecting light from the light-source lamp to provide converged light and an optical assembly for collimating converged light from the reflector to provide a bundle of approximately parallel rays so that the bundle of approximately parallel ray is made to enter the optical system when a transmission type liquid-crystal panel provided with micro-lenses corresponding to individual pixels is used, and disposing a reflector for reflecting light from the light-source lamp to provide a bundle of approximately parallel rays so that the bundle of approximately parallel rays is made to enter the optical system when a transmission type liquid-crystal panel without micro-lens is used.

According to this manufacturing method, when the liquid-crystal projector using the liquid-crystal panel with ML is manufactured and the liquid-crystal projector using the liquid-crystal panel without ML is manufactured, as the optical system in the lighting optical unit for irradiating light from the light-source lamp on the predetermined object in a uniform and/or convergent manner, there is disposed an optical system having a numerical aperture through which a quantity of light incident on the effective area of the pixel of the liquid-crystal panel without ML may become approximately maximum.

Then, when the liquid-crystal projector using the liquid-crystal panel with ML is manufactured, there are disposed the reflector for reflecting light from the light-source lamp to provide converged light and the optical assembly for collimating the converged light from the reflector to provide a bundle of approximately parallel ray that is made to enter this optical system, both of which are the elements comprising the aforementioned lighting optical unit according to the present invention, and hence the assembly of the lighting optical unit is completed.

When, on the other hand, the liquid-crystal projector using the liquid-crystal panel without ML is manufactured, there is disposed the reflector for reflecting light from the light-source lamp to provide a bundle of approximately parallel rays that is made to enter this optical system, and hence the assembly of the lighting optical unit is completed.

As described above, according to this liquid-crystal projector manufacturing method, when the liquid-crystal projector using the liquid-crystal panel with ML and the liquid-crystal projector using the liquid-crystal panel without ML are both manufactured, in the assembling operation of the lighting optical unit the arrangement operation of the optical system for irradiating light from the light-source lamp on the liquid-crystal panel in a uniform and/or convergent manner can be made common to the both projectors. Thus, the aforementioned disadvantage (c) can be removed.

BRIEF DESCRIPTION OF DRAWINGS

FIG. 1 is a diagram showing an example of an arrangement of a conventional lighting optical unit in a liquid-crystal projector using a liquid-crystal panel with. ML compared to a lighting optical unit in a liquid-crystal projector using a liquid-crystal panel without ML.

FIGS. 15A to 15C are diagrams showing a method of manufacturing a liquid-crystal projector according to the present invention.

BEST MODE FOR CARRYING OUT THE INVENTION

Hereinafter, embodiments in which the present invention is applied to a liquid-crystal projector with ML will be specifically described with reference to the drawings.

Figure 2:
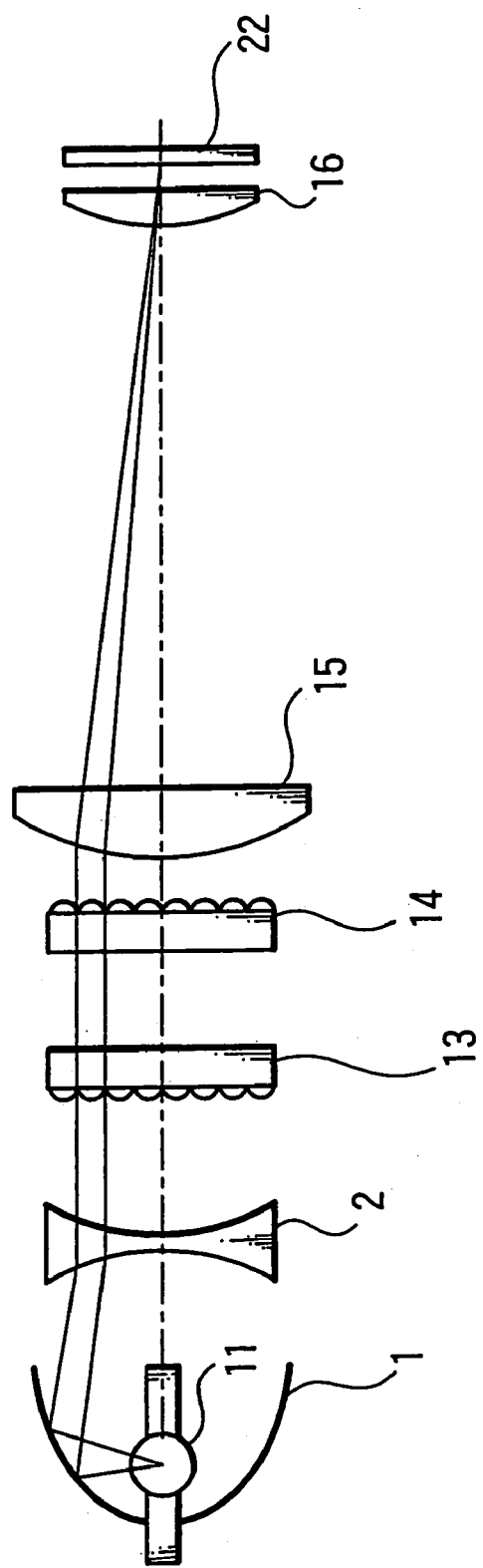
FIG. 2 is a diagram showing an example of an arrangement of a main portion of a first lighting optical unit according to the present invention.

FIG. 2 is a diagram showing an example of an arrangement of a main portion of a first lighting optical unit according to the present invention, wherein elements and parts identical to those in FIG. 1 are denoted by the same reference numerals.

In this lighting optical unit, the light-source lamp 11 is detachably attached to an elliptic reflector 1 having a reflection surface shaped like an ellipse. The elliptic reflector 1 reflects light emitted from the light-source lamp 11 to provide converged light.

The concave lens 2 is disposed on the side of the liquid-crystal panel with ML 22 opposite to the elliptic reflector 1. The concave lens 2 makes converged light from the elliptic reflector 1 diverge in order to provide a bundle of approximately parallel rays.

On the side of liquid-crystal panel with ML 22 from the convex lens 2, there are disposed in order the same fly-eye lenses 13 and 14, the same main condenser lens 15 and the same channel condenser lens 16 as those shown in FIG. 1A, whereby a bundle of approximately parallel rays from the convex lens 2 enters the fly-eye lens 13.

The optical system from this fly-eye lens 13 to the channel condenser lens 16 has a numerical aperture through which a quantity of light incident on the effective area of pixel of a liquid-crystal panel having the same structure as that of the liquid-crystal panel with ML 22 from which ML is removed (the same liquid-crystal panel shown in FIG. 1A) may become approximately maximum, and this system is also designed and manufactured in such a manner as to have an entrance pupil diameter approximately equal to a diameter of a beam spot of a bundle of parallel rays from the reflector 12 shown in FIG. 1A.

Accordingly, this lighting optical unit has an optical path length shorter than that of the conventional lighting optical unit of the liquid-crystal projector using the liquid-crystal panel with ML shown in FIG. 1B (optical path length is longer than that of the lighting optical unit shown in FIG. 1A by a length corresponding to the portion of the concave lens 2).

A difference between the entrance pupil diameter of the fly-eye lens 13 and the diameter of the beam spot of the bundle of approximately parallel rays from the concave lens 2 is made approximately equal to the even-numbered multiple (twice in the figure) of the diameter of individual lenses (lens cells) of the fly-eye lens 13. Therefore, light is not introduced at all into the lens cell at the outermost edge of the fly-eye lens 13 and light is incident on the whole surfaces of the remaining lens cells. As a consequence, light is partly incident on the lens cells of the fly-eye lens 13 to prevent functions of the fly-eye lenses 13 and 14 as the integrators from being damaged.

The manner in which light is irradiated on the liquid-crystal panel with ML 22 by this lighting optical unit will be described below.

Light emitted from the light-source lamp 11 is reflected by the elliptic reflector 1, converted into converged light and collimated into a bundle of approximately parallel rays by the concave lens 2, thereby entering the fly-eye lens 13. Accordingly, into the fly-eye lens 13 there is introduced a bundle of approximately parallel rays whose diameter of the beam spot is smaller than that obtained when light from the light-source lamp 11 is directly converted into a bundle of approximately parallel rays as shown in FIG. 1A.

This bundle of approximately parallel rays having the small diameter of the beam spot is made uniform by the fly-eye lenses 13, 14, and converged by the main condenser lens 15 and the channel condenser lens 16, thereby being irradiated on the liquid-crystal panel with ML 22.

As a result, the liquid-crystal panel with ML 22 is irradiated with light that has a maximum conical angle smaller than that of light irradiated on the liquid-crystal panel 17 shown in FIG. 1A. That is, an apparent numerical aperture of the optical system from the fly-eye lens 13 to the channel condenser lens 16 decreases with respect to the liquid-crystal panel with ML 22.

Therefore, refracted light at the ML is prevented from entering the portions other than the effective area of the pixel of the liquid-crystal panel with ML 22, whereby a quantity of light incident on the effective area may increase.

As described above, according to the present invention, while a demand for increasing a quantity of light incident on the effective area of the pixel of the liquid-crystal panel with ML 22 is being satisfied, the outside dimension of the lighting optical unit can be reduced by shortening the optical path length of the lighting optical unit.

Further, when the liquid-crystal projector using the liquid-crystal panel with ML 22 and the liquid-crystal projector using the liquid-crystal panel without ML (liquid-crystal panel 17 shown in FIG. 1A) are both manufactured, since the optical system from the fly-eye lens 13 to the channel condenser lens 16 in the lighting optical unit can be made common to both the projectors, costs of assemblies can be reduced.

Figure 3:
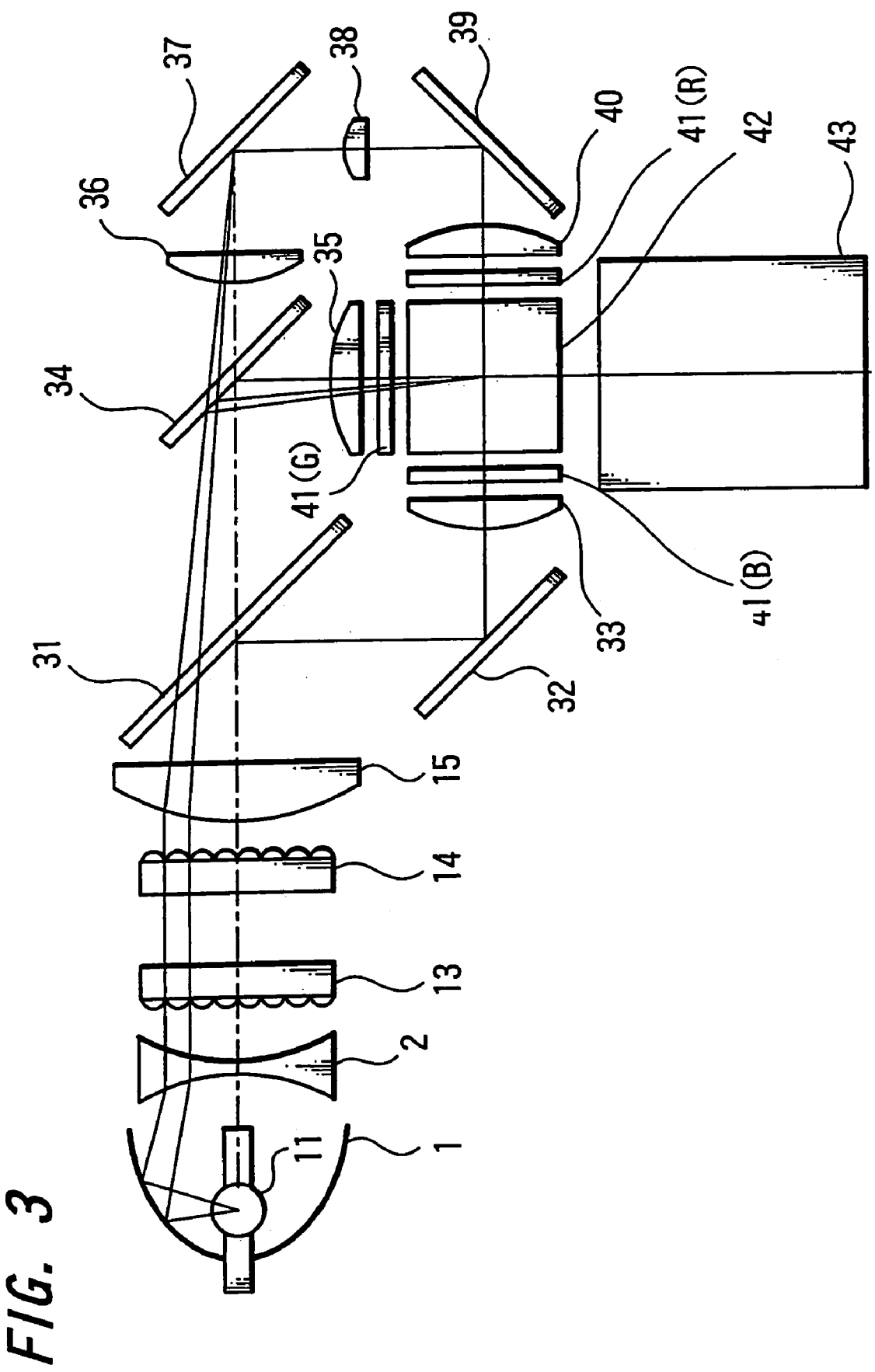
FIG. 3 is a diagram showing an example of an arrangement of a liquid-crystal projector to which the lighting optical unit of FIG. 2 is applied.

FIG. 3 is a diagram showing an example of an arrangement of the liquid-crystal projector (first liquid-crystal projector according to the present invention) to which the lighting optical unit shown in FIG. 2 is applied, wherein elements and parts identical to those of FIG. 2 are denoted by the same reference numerals.

Light emitted from the light-source lamp 11 is converted into converged light and collimated into a bundle of approximately parallel rays by the elliptic reflector 1, the concave lens 2, respectively and introduced into a dichroic mirror 31 through the fly-eye lenses 13, 14 and the main condenser lens 15.

Then, blue light reflected by the dichroic mirror 31 is irradiated on a blue color display liquid-crystal panel with ML 41(B) through a mirror 32 and a channel condenser lens 33.

Green light of the light transmitted through the dichroic mirror 31 is reflected by a dichroic mirror 34 and introduced into a green color display liquid-crystal panel with ML 41(G) through a channel condenser lens 35.

Red light transmitted through the dichroic mirror 34 is introduced into a red color display liquid-crystal panel with ML 41(R) through a relay lens 36, a mirror 37, a relay lens 38, a mirror 39 and a channel condenser lens 40.

Red light, green light, blue light transmitted through the liquid-crystal panels with ML 41(R), 41(G), 41(B), respectively, are synthesized by a dichroic prism 42, thereby entering a projection lens 43.

In this liquid-crystal projector, the optical system from the fly-eye lens 13 to the channel condenser lenses 33, 35, 40 is designed and manufactured in such a manner that the system has a numerical aperture through which a quantity of light incident on the effective area of the pixel of the liquid-crystal panel having the same structure as those of the liquid-crystal panels with ML 41(R), 41(G), 41(B) from which MLs are removed may become approximately maximum, and that the system has an entrance pupil diameter approximately equal to the diameter of the beam spot of the bundle of parallel rays from the reflector 12 shown in FIG. 1A.

In this liquid-crystal projector, from exactly the same reason that had been set forth with respect to the lighting optical unit shown in FIG. 2, while a demand for increasing a quantity of light incident on the effective areas of the pixel of the liquid-crystal panels with ML 41(R), 41(G), 41(B) is being satisfied, the outside dimension of the liquid-crystal projector can be reduced by shortening the optical path length of the lighting optical unit. Further, when this liquid-crystal projector and the liquid-crystal projector using the liquid-crystal panel without ML are both manufactured, the optical system from the fly-eye lens 13 to the channel condenser lenses 33, 35, 40 can be made common to both the projectors, whereby costs of the assemblies can be reduced.

Figure 4:
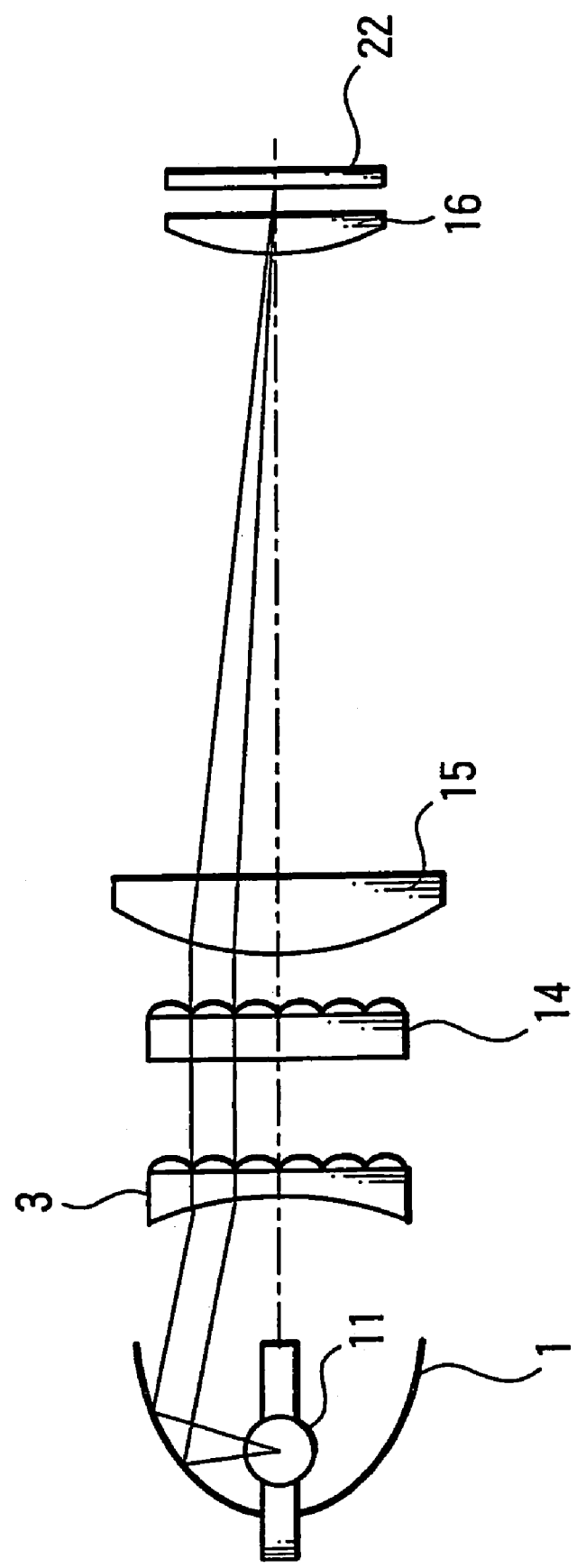
FIG. 4 is a diagram showing another example of the arrangement of the main portion of the first lighting optical unit according to the present invention.

Next, FIG. 4 is a diagram showing another example of the arrangement of the main portion of the first lighting optical unit according to the present invention, wherein elements and parts identical to those of FIG. 2 are denoted by the same reference numerals.

In this lighting optical unit, the concave lens shown in FIG. 2 is not provided, the fly-eye lens 13 shown in FIG. 2 is replaced with a concave fly-eye lens 3 curved like a concave lens, and hence converged light from the elliptic reflector 1 is incident on this concave fly-eye lens 3.

The concave fly-eye lens 3 diverges converged light from the elliptic reflector 1 in order to make converged light become a bundle of approximately parallel rays, and functions as an element comprising the integrator similarly to the fly-eye lens 13 shown in FIG. 2.

A difference between the entrance pupil diameter of the concave fly-eye lens 3 and the diameter of the beam spot of the converged light incident on the concave fly-eye lens 3 is approximately equal to the even-numbered multiple (twice in FIG. 2) of the diameter of the lens cell of the concave fly-eye lens 3.

The rest of arrangement of this lighting optical unit is the same as that of the lighting optical unit shown in FIG. 2. Accordingly, in this lighting optical unit, the optical path length is made even shorter than that of the lighting optical unit shown in FIG. 2 (the optical path length is approximately equal to that of the lighting optical unit shown in FIG. 1A).

In this lighting optical unit, the elliptic reflector 1 reflects light emitted from the light-source lamp 11 to provide converged light and this converged light is introduced into the concave fly-eye lens 3. Then, the concave fly-eye lens 3 collimates the converged light to provide a bundle of approximately parallel rays and this bundle of approximately parallel rays is made uniform by the concave fly-eye lens 3 and the fly-eye lens 14.

As a result, the liquid-crystal panel with ML 22 is irradiated with light in which a maximum conical angle of incident light is smaller than that of light incident on the liquid-crystal panel 17 shown in FIG. 1A. That is, with respect to the liquid-crystal panel with ML 22, the apparent numerical aperture of the optical system from the concave fly-eye lens 3 to the channel condenser lens 16 is small.

Thus, while a demand for increasing a quantity of light incident on the effective area of the pixel of the liquid-crystal panel with ML 22 is being satisfied, the optical path length of the lighting optical unit can be made even shorter than that of the lighting optical unit shown in FIG. 2 and hence the outside dimension of the lighting optical unit can be reduced.

Since the fly-eye lens 3 also serves as the optical assembly for collimating the converged light from the elliptic reflector 1 to provide a bundle of approximately parallel rays, it is possible to reduce the number of optical assemblies of the lighting optical unit.

When the liquid-crystal projector using the liquid-crystal panel with ML 22 and the liquid-crystal projector using the liquid-crystal panel without ML are both manufactured, the optical system from the fly-eye lens 14 to the channel condenser lens 16 can be made common to both the projectors and hence costs of assemblies can be reduced.

Figure 5:
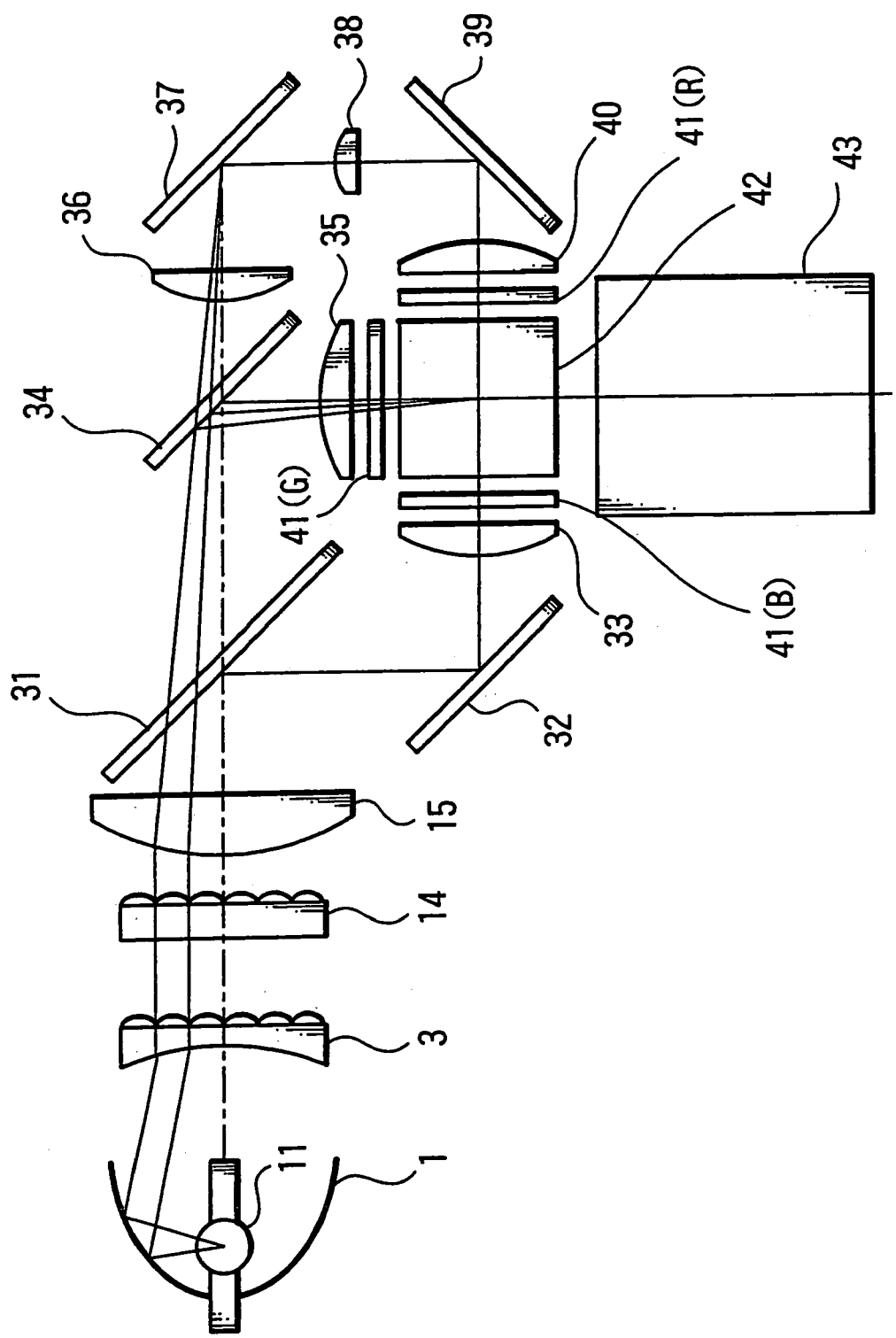
FIG. 5 is a diagram showing an example of an arrangement of a liquid-crystal projector to which the lighting optical unit of FIG. 4 is applied.

FIG. 5 is a diagram showing an example of an arrangement of the liquid-crystal projector (first liquid-crystal projector according to the present invention) to which the lighting optical unit shown in FIG. 4 is applied, wherein elements and parts identical to those of FIGS. 3 and 4 are denoted by the same reference numerals.

Also in this liquid-crystal projector, from exactly the same reason that has been set forth with respect to the lighting optical unit shown in FIG. 4, while a demand for increasing the quantity of light incident on the effective area of the pixels of the liquid-crystal panels with ML 41(R), 41(G), 41(B) is being satisfied, the outside dimension of the lighting optical unit can be reduced by shortening the optical path length of this lighting optical unit. Moreover, when this liquid-crystal projector and the liquid-crystal projector using the liquid-crystal panel without ML are both manufactured, the optical system from the fly-eye lens 14 to the channel condenser lenses 33, 35, 40 can be made common to both the projectors and costs of assemblies can be reduced.

Figure 6:
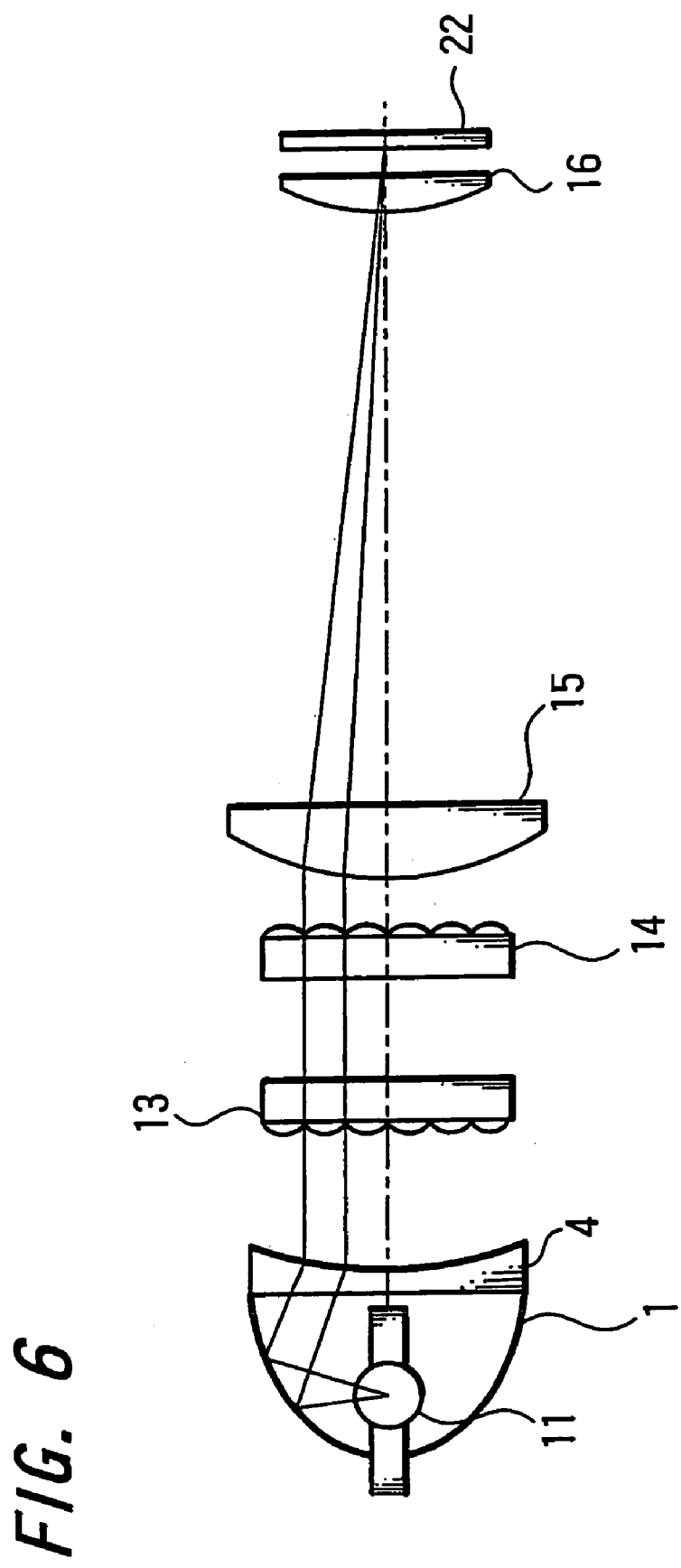
FIG. 6 is a diagram showing a further example of the arrangement of the main portion of the first lighting optical unit according to the present invention.

Next, FIG. 6 is a diagram showing a further example of the arrangement of the main portion of the first lighting optical unit according to the present invention, wherein elements and parts identical to those of FIG. 2 are denoted by the same reference numerals.

In this lighting optical unit, the concave lens 2 shown in FIG. 2 is not provided and the concave cover glass 4 curved as a concave lens is fixedly attached to the elliptic reflector 1. This concave cover glass 4 diverges converged light from the elliptic reflector 1 in order to collimate the converged light into a bundle of approximately parallel rays. A bundle of approximately parallel rays from this concave cover glass 4 enters the fly-eye lens 13.

A difference between the entrance pupil diameter of the fly-eye lens 13 and the diameter of the beam spot of a bundle of approximately parallel rays from the concave cover glass 4 is approximately equal to the even-numbered multiple (twice in the figure) of the diameter of the lens cell of the fly-eye lens 13.

The rest of arrangement of this lighting optical unit is the same as that of the lighting optical unit shown in FIG. 2. Accordingly, the optical path length of this lighting optical unit is made even shorter than that of the lighting optical unit shown in FIG. 2 (the optical path length is made approximately equal to that of the lighting optical unit shown in FIG. 1A).

In this lighting optical unit, after light emitted from the light-source lamp 11 is reflected on the elliptic reflector 1 to become converged light, this converged light is collimated by the concave cover glass 4 into a bundle of approximately parallel rays and enters the fly-eye lens 13.

As a consequence, the liquid-crystal panel with ML 22 is irradiated with light in which a maximum conical angle of incident light is smaller than that of light irradiated on the liquid-crystal panel 17 shown in FIG. 1A. That is, with respect to the liquid-crystal panel with ML 22, the apparent numerical aperture of the optical system from the fly-eye lens 13 to the channel condenser lens 16 is small.

Thus, while a demand for increasing the quantity of light incident on the effective area of the pixels of the liquid-crystal panel with ML 22 is being satisfied, the optical path length of the lighting optical unit can be made even shorter than that of the lighting optical unit shown in FIG. 2 and the outside dimension of the lighting optical unit can be reduced.

When the liquid-crystal projector using the liquid-crystal panel with ML 22 and the liquid-crystal projector using the liquid-crystal panel without ML are both manufactured, the optical system from the fly-eye lens 13 to the channel condenser lens 16 in the lighting optical unit can be made common to both the projectors and hence costs of assemblies can decrease.

Figure 7:
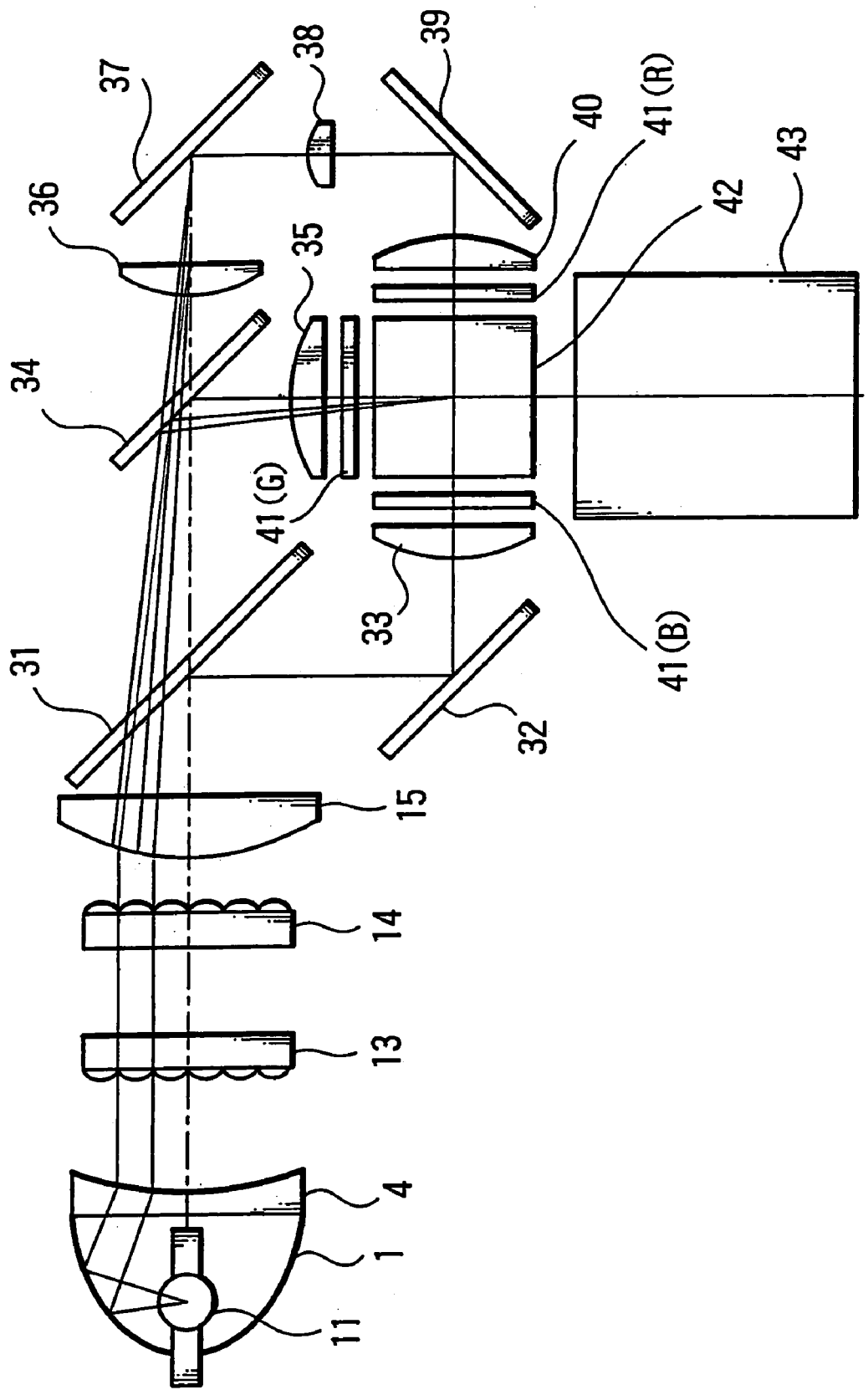
FIG. 7 is a diagram showing an example of an arrangement of a liquid-crystal projector to which the lighting optical unit of FIG. 6 is applied.

FIG. 7 is a diagram showing an example of an arrangement of a liquid-crystal projector to which the lighting optical unit shown in FIG. 6 is applied (first liquid-crystal projector according to the present invention), wherein elements and parts identical to those of FIGS. 3 and 6 are denoted by the same reference numerals.

Also in this liquid-crystal projector, from the same reason that has been set forth with respect to the lighting optical unit shown in FIG. 6, while a demand for increasing a quantity of light incident on the effective area of the pixel of the liquid-crystal panels with ML 41(R), 41(G), 41(B) is being satisfied, the outside dimension of the lighting optical unit can be reduced by shortening the optical path length of the lighting optical unit. Moreover, when this liquid-crystal projector and the liquid-crystal projector using the liquid-crystal panel without ML are both manufactured, the optical system from the fly-eye lens 13 to the channel condenser lenses 33, 35, 40 can be made common to both the projectors and hence costs of assemblies can be reduced.

Figure 8:
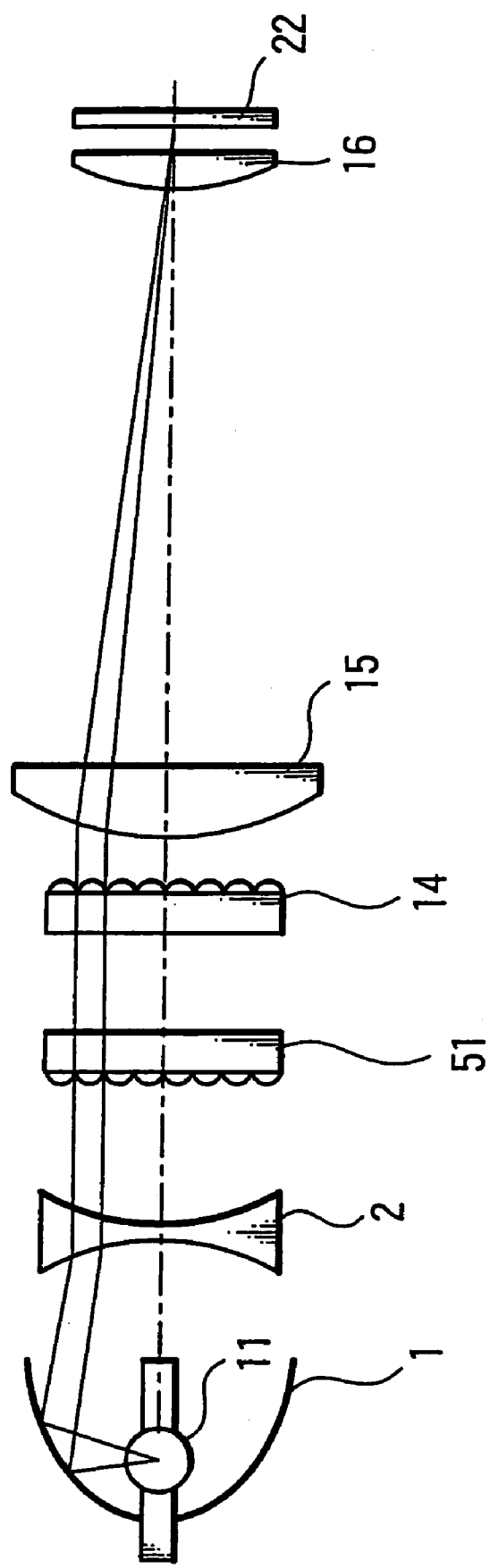
FIG. 8 is a diagram showing an example of an arrangement of a main portion of a second lighting optical unit according to the present invention.

Next, FIG. 8 is a diagram showing an example of an arrangement of the main portion of the second lighting optical unit according to the present invention, wherein elements and parts identical to those of FIG. 2 are denoted by the same reference numerals.

In this lighting optical unit, a fly-eye lens 51 is provided. The fly-eye lens 51 functions as an element comprising the integrator similarly to the fly-eye lens 13 shown in FIG. 2.

A difference between the entrance pupil diameter of the fly-eye lens 51 and the diameter of the beam spot of the converged light incident on the fly-eye lens 51 is made approximately equal to the even-numbered multiple (twice in the figure) of the diameter of the lens cell of the fly-eye lens 51.

Although not shown in FIG. 8, in the fly-eye lens 51, the position of the vertex of the lens cell is deviated from the center of the opening of the lens cell.

Figure 9:
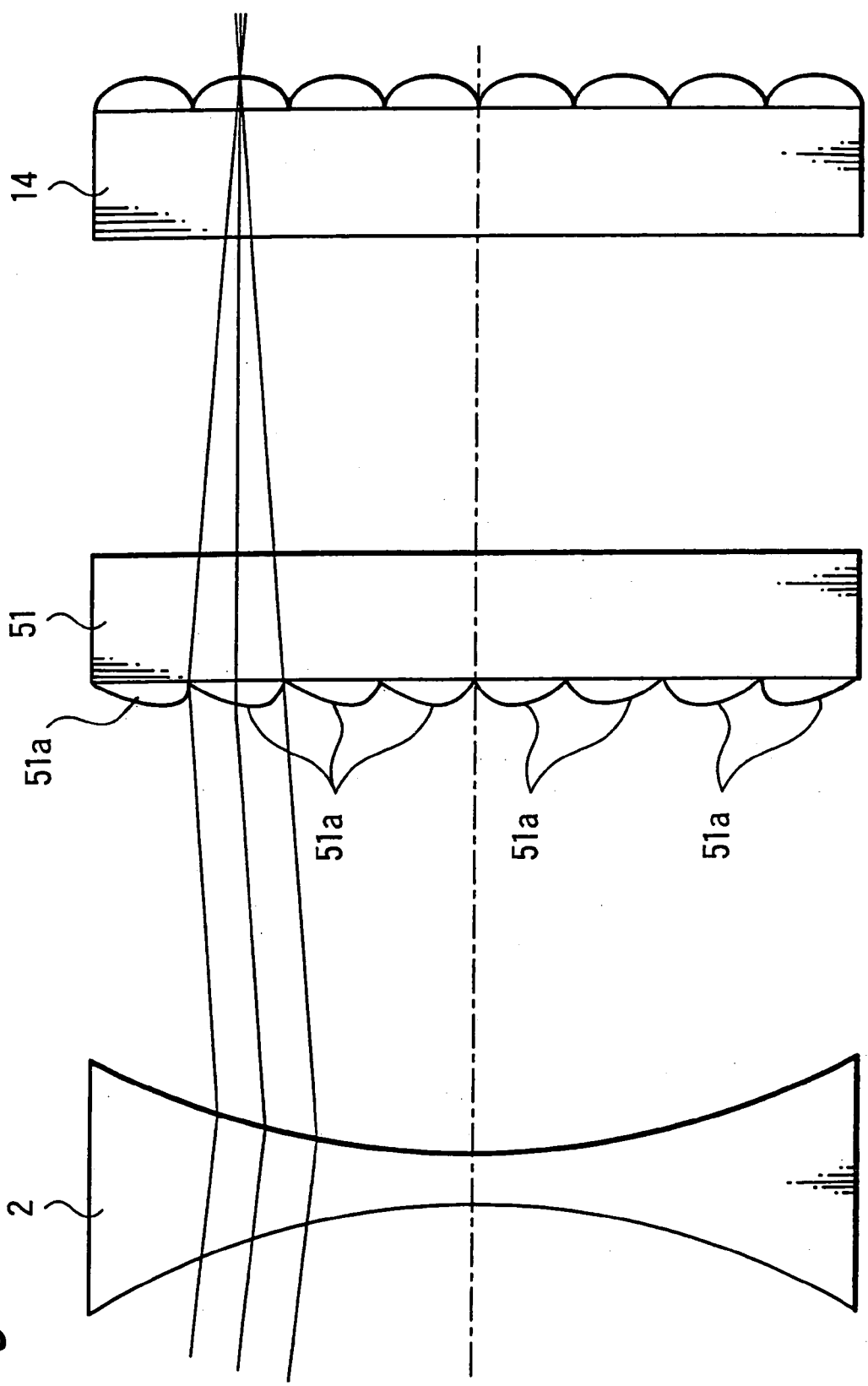
FIG. 9 is a diagram showing the enlarged portion from a convex lens to a fly-eye lens in the lighting optical unit shown in FIG. 8.

FIG. 9 is an enlarged diagram showing the parts from the concave lens 2 to the fly-eye lens 14 in this lighting optical unit. Although the concave lens 2 is provided in order to collimate converged light from the elliptic reflector 1 into a bundle of approximately parallel rays, if only the concave lens 2 is provided, as shown in the FIG. 9, converged light from the elliptic reflector 1 may not be collimated as a bundle of rays whose parallelism is sufficiently high (in FIG. 9 this aberration is shown in an exaggerated fashion). In this case, a bundle of rays whose parallelism is not so high enters the fly-eye lens 41.

In the fly-eye lens 51, the position of the vertex of the lens cell 51 is deviated from the center of the opening of the lens cell 51a in response to the aberration of this concave lens 2 so that parallelism of light from the fly-eye lens 61 is enhanced.

Figure 10:
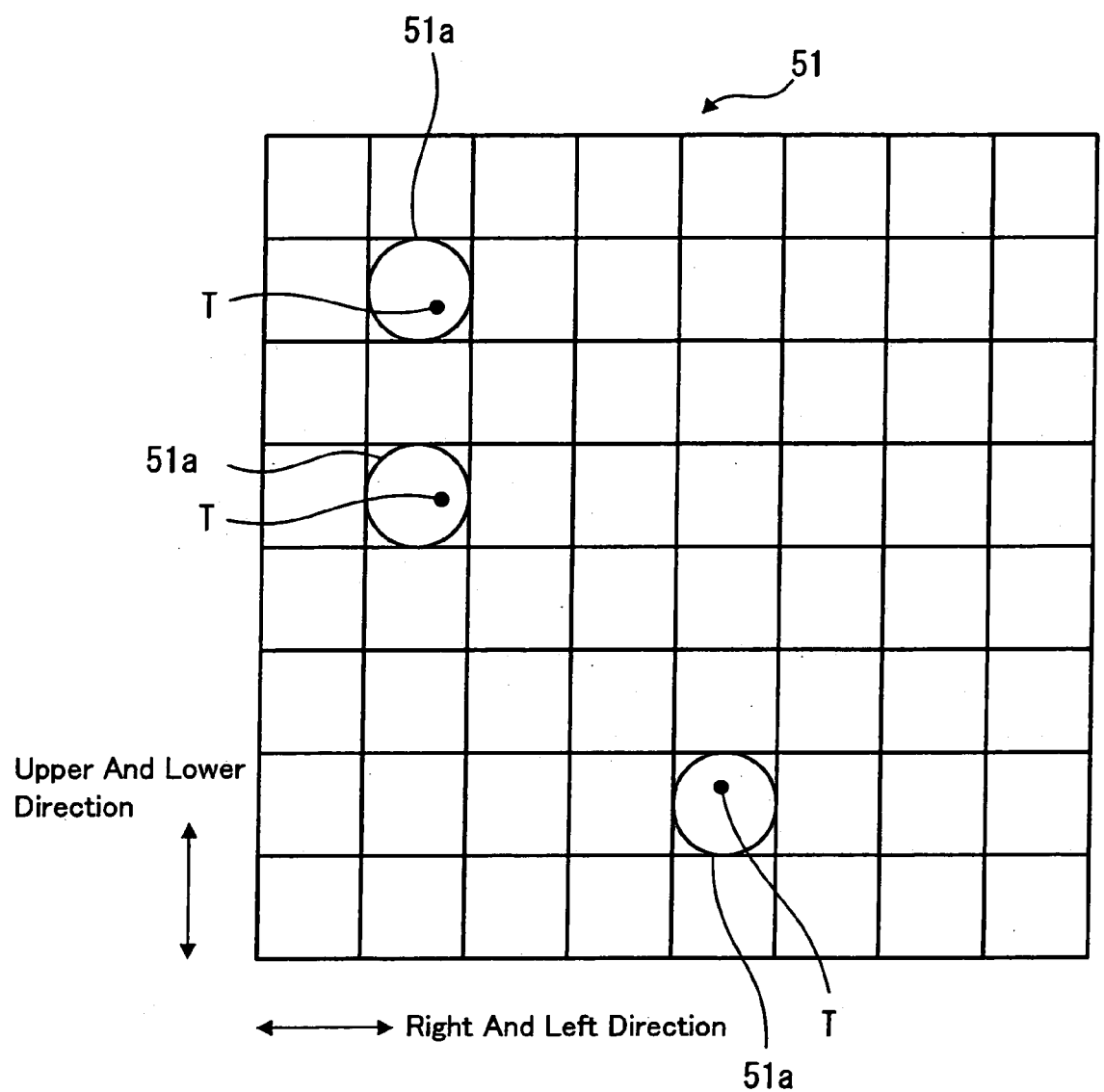
FIG. 10 is a diagram showing the direction in which the position of a vertex of a lens cell 51a shown in FIG. 9 is deviated.

While FIG. 9 shows the side view of the fly-eye lens 51, the position of a vertex T, as shown in FIG. 10, of the lens cell 51a located in the upper and lower direction of the optical axis (axis perpendicular to the sheet of drawing) of the lighting optical unit is made eccentric with respect to the upper and lower direction, the position of the vertex T of the lens cell 51a located in the right and left direction of this optical axis is made eccentric with respect to the right and left direction and the position of the vertex T of the lens cell 51a located in the diagonal direction of this optical axis is made eccentric with respect to both of the upper and lower direction and the right and left direction.

Fundamentally, the amount of deviation of the vertex position in the lens cell 51a provided near the outer edge of the fly-eye lens 51 is larger than the amount of that provided near the central portion of the fly-eye lens 51.

The rest of arrangement of this lighting optical unit is similar to that of the lighting optical unit shown in FIG. 2.

In the lighting optical unit including the integrator, when a bundle of rays whose parallelism is not so high enters the opening portion of the lens cell of the first fly-eye lens (fly-eye lens 13 in FIG. 2) of the integrator, of light from the lens cell of the first fly-eye lens a quantity of light incident on the opening portion of the corresponding lens cell in the second fly-eye lens (fly-eye lens 14 in FIGS. 2 and 8) decreases, so that a quantity of light irradiated on the liquid-crystal panel with ML 22 may also decrease.

As a method for preventing a quantity of light irradiated on the liquid-crystal panel with ML 22 from decreasing due to this aberration and for enhancing efficiency in utilizing light from the light-source lamp 11, there is known a method in which the direction of light is changed by means of new optical assemblies such as an aspherical lens, whereby a quantity of light incident on the opening portion of the lens cell of the second fly-eye lens increases.

When this method is employed, however, the number of optical assemblies of the lighting optical unit increases and the optical path length of the lighting optical unit lengthens, so that the outside dimension of the lighting optical unit increases unavoidably.

Therefore, in this lighting optical unit, the vertex position of the lens cell 51a of the fly-eye lens 51 serving as the first fly-eye lens is deviated from the center of the opening of the lens cell 51 in response to the aberration of the concave lens 2, whereby parallelism of light from the fly-eye lens 51 can be enhanced (in other words, the first fly-eye lens can serve as an aspherical lens or the like as well).

According to this lighting optical unit, in exactly the same manner as that of the lighting optical unit shown in FIG. 2, while a demand for increasing a quantity of light incident on the effective area of the pixel of the liquid-crystal panel with ML 22 is being satisfied, the outside dimension of the lighting optical unit can be reduced by shortening the optical path length of the lighting optical unit.

When the liquid-crystal projector using the liquid-crystal panel with ML 22 and the liquid-crystal projector using the liquid-crystal panel without ML are both manufactured, the optical system from the fly-eye lens 14 to the channel condenser lens 16 in the lighting optical unit can be made common to both the projectors and hence costs of assemblies can be reduced.

Further, decrease in light incident on the fly-eye lens 14 (decrease in light irradiated on the liquid-crystal panel with ML 22) due to the aberration of the concave lens 2 can be prevented without increasing the number of optical assemblies and without increasing the outside dimension of the lighting optical unit, so that efficiency in utilizing light from the light-source lamp 11 can be enhanced.

Figure 11:
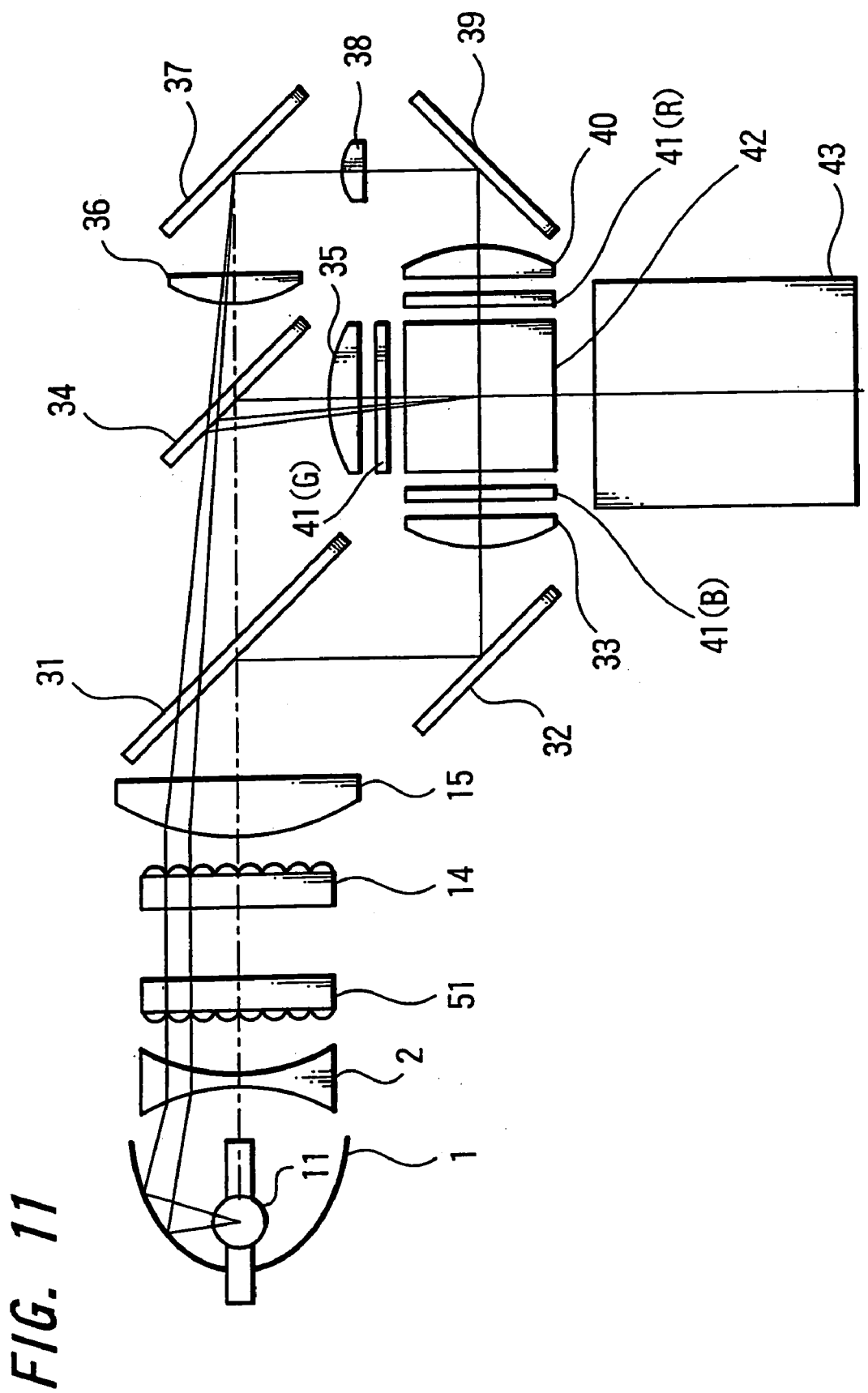
FIG. 11 is a diagram showing an example of an arrangement of a liquid-crystal projector to which the lighting optical unit of FIG. 8 is applied.

FIG. 11 is a diagram showing an example of an arrangement of a liquid-crystal projector to which the lighting optical unit shown in FIG. 8 is applied (the second liquid-crystal projector according to the present invention), wherein elements and parts identical to those of FIGS. 2 and 3 are denoted by the same reference numerals.

Also in this liquid-crystal projector, from exactly the same reason that has been set forth with respect to the lighting optical unit shown in FIG. 8, while a demand for increasing a quantity of light incident on the effective area of the pixels of the liquid-crystal panels with ML 41(R), 41(G), 41(B) is being satisfied, the outside dimension of the lighting optical unit can be reduced by shortening the optical path length of the lighting optical unit and the number of optical assemblies in the lighting optical unit decreases. Further, when this liquid-crystal projector and the liquid-crystal projector using the liquid-crystal panel without ML are both manufactured, the optical system from the fly-eye lens 14 to the channel condenser lenses 33, 35, 40 can be made common to both the projectors so that costs of assemblies can be reduced. Moreover, decrease in a quantity of light incident on the fly-eye lens 14 (decrease in a quantity of light irradiated on the liquid-crystal panel with ML 22) due to the aberration of the concave lens 2 can be prevented without increasing the number of optical assemblies and without increasing the outside dimension of the lighting optical unit (accordingly, without increasing the whole of the liquid-crystal projector in size), whereby efficiency of utilizing light from the light-source lamp 11 can be enhanced.

Figure 12:
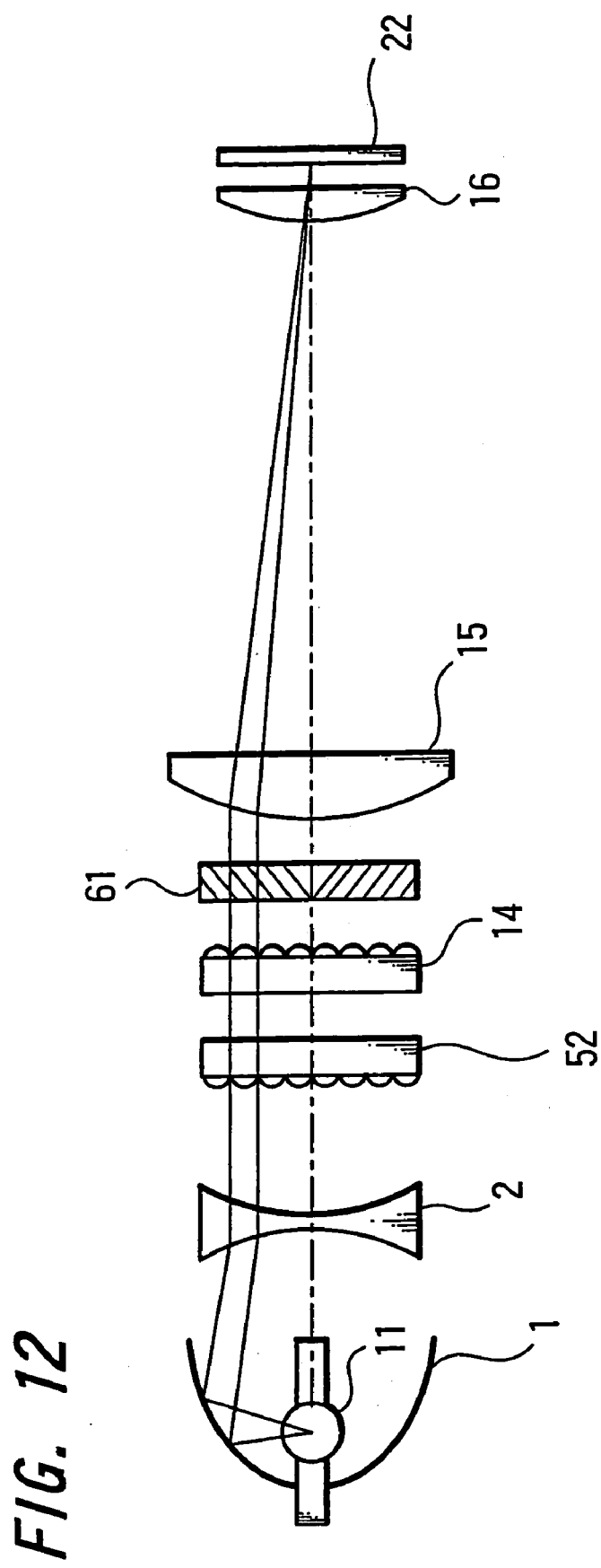
FIG. 12 is a diagram showing an example of an arrangement of a main portion of a second lighting optical unit according to the present invention.

Next, FIG. 12 is a diagram showing another example of the arrangement of the main portion of the second lighting optical unit according to the present invention, wherein elements and parts identical to those of FIG. 8 are denoted by the same reference numerals.

In this lighting optical unit, the fly-eye lens 13 shown in FIG. 2 is replaced with a fly-eye lens 52 and converged light from the elliptic reflector 1 enters the fly-eye lens 52.

The fly-eye lens 52 functions as an element comprising the integrator similarly to the fly-eye lens 13 shown in FIG. 2.

A difference between the entrance pupil diameter of the fly-eye lens 52 and the diameter of the beam spot of the converged light incident on the fly-eye lens 52 is made approximately equal to the even-numbered multiple (twice in the figure) of the diameter of the lens cell of the fly-lens 52.

Although not shown in FIG. 12, in the fly-eye lens 52, the position of the vertex of the lens cell is deviated from the center of the opening of the lens cell.

Further, in this lighting optical unit, a polarizing transducer element 61 is disposed between the fly-eye lens 14 and the main condenser lens 15.

Figure 13:
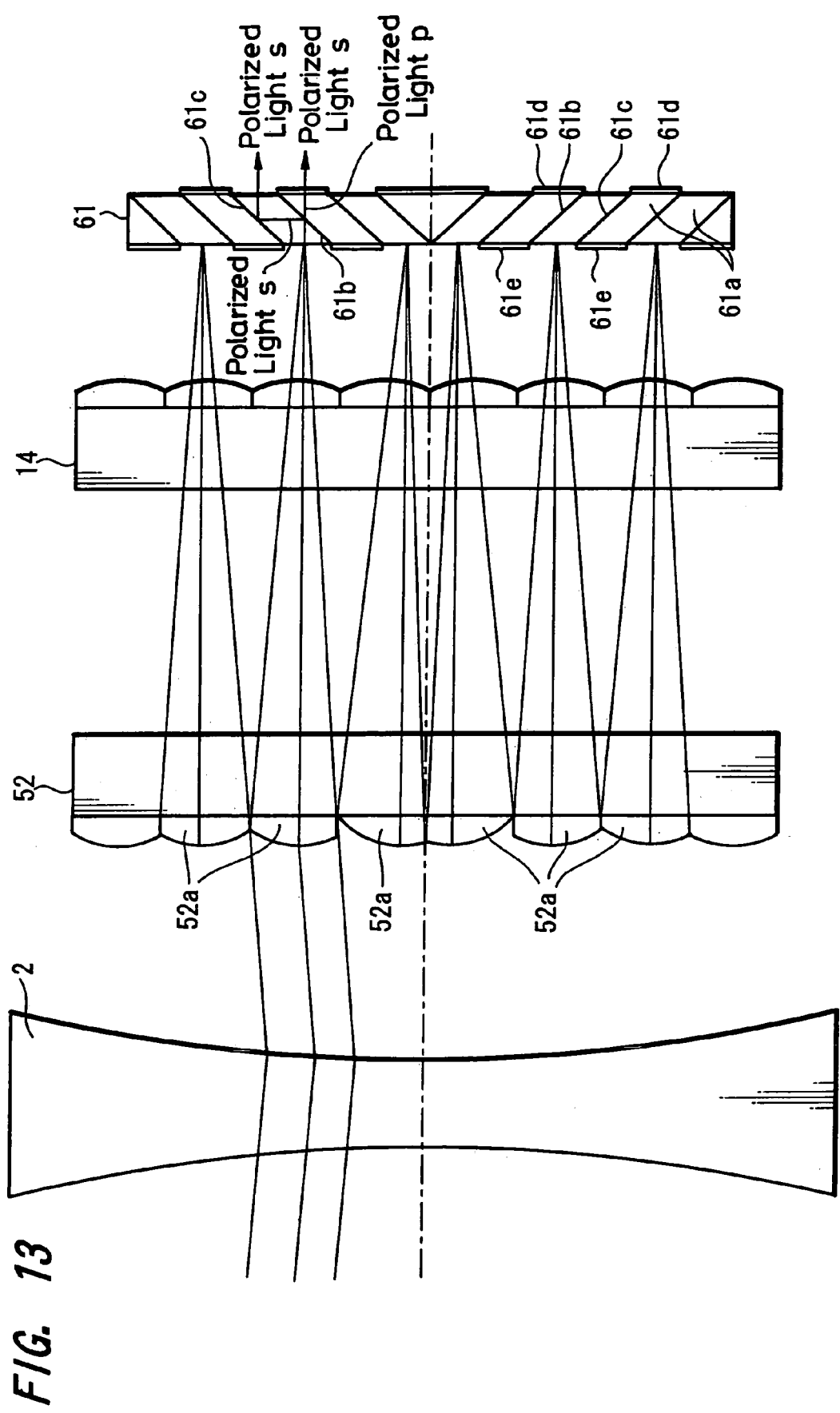
FIG. 13 is a diagram showing the enlarged portion from a convex lens to a polarizing transducer element in the lighting optical unit shown in FIG. 12.

FIG. 13 is an enlarged diagram showing the parts from the concave lens 2 to the polarizing transducer element 61 in this lighting optical unit. The polarizing transducer element 61 is formed by laminating a plurality of prisms 61a, in which polarizing separation films 61b for transmitting polarized light P and reflecting polarized light S of light from the fly-eye lens 14, and reflection planes 61c for reflecting the polarized light S reflected on the polarizing separation film 61b to be emit from the polarizing transducer element 61 are alternately formed on the laminated surface.

To the exit side surface of the polarizing transducer element 61, there is attached a half-wave plate 61d which transduces the polarized light P transmitted through the polarizing separation film 61b to provide polarized light S. Further, to the entrance side surface of the polarizing transducer element 61, there is attached a shielding film 61e that can prevent light from the fly-eye lens 14 from directly entering the reflection plane 61c.

A pitch of the opening portion (portion of the entrance side surface without the shielding film 61e being attached) of the polarizing transducer element 61 is not corresponding to those of the opening portions of the lens cells of the fly-eye lenses 52 and 14, and is larger than those pitches.

While the vertex positions of the individual lens cells 51a in the fly-eye lens 51 of the lighting optical unit shown in FIG. 8 are deviated in order to enhance parallelism of light from the fly-eye lens 51, in the fly-eye lens 52, the vertex positions of the individual lens cells 52a are made to be eccentric such that the direction of light from the lens cell 52a is directed toward the opening portion of the polarizing transducer element 61. Accordingly, the amount of deviation of the vertex position in the lens cell 52a provided near the outer edge of the fly-eye lens 52 is not always larger than the amount of deviation of the vertex position in the lens cell 52a provided near the central portion of the fly-eye lens 52.

The rest of arrangement of this lighting optical unit is similar to that of the lighting optical unit shown in FIG. 2.

In the lighting optical unit including the integrator and the polarizing transducer element, when a bundle of rays whose parallelism is not so high enters the opening portion of the lens cell of the first fly-eye lens of the integrator (fly-eye lens 13 in FIG. 2), there is a possibility that a quantity of light entering the opening portion of the polarizing transducer element from the integrator will decrease, so that a quantity of light irradiated on the liquid-crystal panel with ML 22 will also decrease.

When there is employed a method of changing the direction of light by providing new optical assemblies such as an aspherical lens for preventing a quantity of light irradiated on the liquid-crystal panel with ML 22 from decreasing due to this aberration and for enhancing efficiency in utilizing light from the light-source lamp 11, the number of optical assemblies in the lighting optical unit unavoidably increases and the optical path length of the lighting optical unit lengthens, so that the outside dimension of the lighting optical unit increases.

Therefore, in this lighting optical unit, the vertex position of the lens cell 52a in the fly-eye lens 52 serving as the first fly-eye lens is deviated such that the direction of light from the lens cell 52a is directed toward the opening portion of the polarizing transducer element 61.

In this lighting optical unit, in exactly the manner as that in the lighting optical unit shown in FIG. 2, while a demand for increasing a quantity of light incident on the effective area of the pixel of the liquid-crystal panel with ML 22 is being satisfied, the outside dimension of the lighting optical unit can be reduced by shortening the optical path length of the lighting optical unit.

Further, when the liquid-crystal projector using the liquid-crystal panel with ML 22 and the liquid-crystal projector using the liquid-crystal panel without ML are both manufactured, the optical system from the fly-eye lens 14 to the channel condenser lens 16 in the lighting optical unit can be made common to both the projector and hence costs of assemblies can be reduced.

Furthermore, efficiency in utilizing light from the light-source lamp 11 can be enhanced by preventing a quantity of light incident on the polarizing transducer element 61 from decreasing (decrease in a quantity of light entered the liquid-crystal panel with ML 22) due to the aberration of the concave lens 2 without increasing the number of optical assemblies and without increasing the outside dimension of the lighting optical unit.

Figure 14:
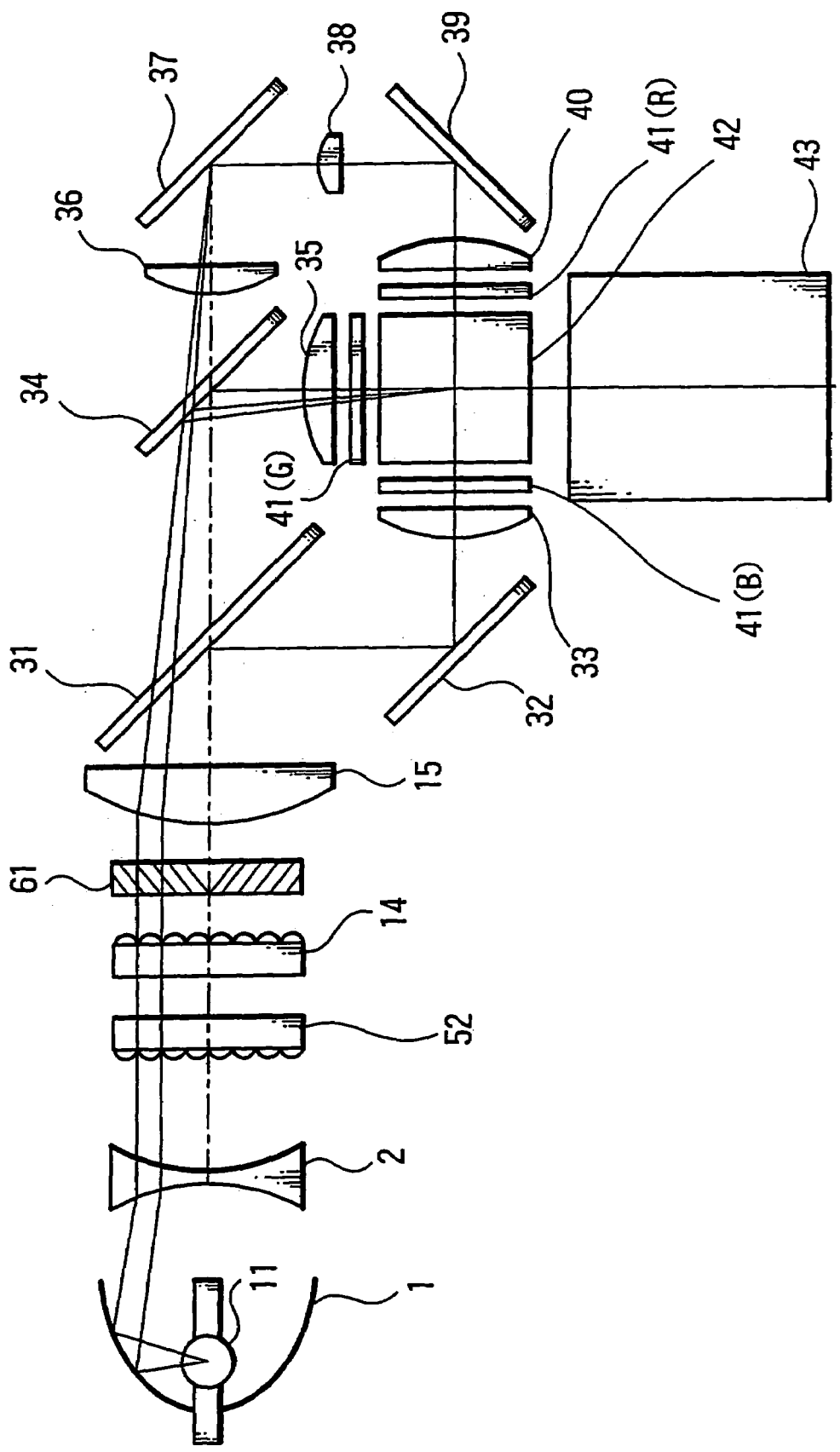
FIG. 14 is a diagram showing an example of an arrangement of a liquid-crystal projector to which the lighting optical unit of FIG. 12 is applied.

FIG. 14 is a diagram showing an example of an arrangement of a liquid-crystal projector to which the lighting optical unit shown in FIG. 12 is applied (the second liquid-crystal projector according to the present invention), wherein elements and parts identical to those in FIGS. 2 and 3 are denoted by the same reference numerals.

Also in this liquid-crystal projector, from exactly the same reason that had been set forth with respect to the lighting optical unit shown in FIG. 12, while a demand for increasing a quantity of light incident on the effective areas of the pixels of the liquid-crystal panels with ML 41(R), 41(G), 41(B) is being satisfied, the outside dimension of the lighting optical unit can be reduced by shortening the optical path length of the lighting optical unit and the number of optical assemblies in the lighting optical unit may decrease. Further, when this liquid-crystal projector and the projector using the liquid-crystal panel without ML are both manufactured, the optical system from the fly-eye lens 14 to the channel condenser lenses 33, 35, 40 can be made common to both the projectors so that costs of assemblies can be reduced. Furthermore, efficiency in utilizing light from the light-source lamp 11 can be enhanced by preventing decrease in a quantity of light incident on the polarizing transducer element 61 (decrease in a quantity of light irradiated on the liquid-crystal panel with ML 22) due to the aberration of the concave lens 2 without increasing the number of optical assemblies and without increasing the outside dimension of the lighting optical unit (accordingly, without causing the whole of the liquid-crystal projector to become large in size).

Finally, with reference to the lighting optical unit shown in FIG. 2 as an example, there will be described a manufacturing method when the liquid-crystal projector using the liquid-crystal panel with ML and the liquid-crystal projector using the liquid-crystal panel without ML are both manufactured.

FIG. 15 shows this manufacturing method. When the liquid-crystal projector using the liquid-crystal panel with ML is manufactured and when the liquid-crystal projector using the liquid-crystal panel without ML is manufactured, first, as shown in FIG. 15A, there is disposed the optical system from the fly-eye lens 13 to the channel condenser lens 16 shown in FIG. 2 (the optical system designed and manufactured in such a manner that it may have a numerical aperture through which a quantity of light incident on the effective area of the pixel of the liquid-crystal panel 17 shown in FIG. 1A becomes approximately maximum and that it may have an entrance pupil diameter approximately equal to the diameter of the beam spot of a bundle of parallel rays from the reflector 12 shown in FIG. 1A as mentioned before).

Then, when the liquid-crystal projector using the liquid-crystal panel with ML is manufactured, as shown in FIG. 15B, the light-source lamp 11 is attached to the elliptic reflector 1 (FIG. 2), and this elliptic reflector 1 and the convex lens 2 (FIG. 2) are disposed at the stage prior to the fly-eye lens 13. Thus, the assembly of the lighting optical unit shown in FIG. 2 is completed.

When, on the other hand, the liquid-crystal projector using the liquid-crystal panel without ML is manufactured, as shown in FIG. 15C, the light-source lamp 11 is attached to the reflector 12 (FIG. 1A) and this reflector 12 is disposed at the stage prior to the fly-eye lens 13a. Thus, the assembly of the lighting optical unit shown in FIG. 1A is completed.

According to this manufacturing method, when the liquid-crystal projector using the liquid-crystal panel with ML and the liquid-crystal projector using the liquid-crystal panel without ML are both manufactured, in the assembly operation of the lighting optical units an arrangement operation of the optical system from the fly-eye lens 13 to the channel condenser lens 16 can be made common to both the projectors, whereby a manufacturing operation can be made efficient.

In the above-mentioned embodiments, the entrance pupil diameter of the optical system from the fly-eye lens (integrator) to the channel condenser lens in the lighting optical unit is made larger than the diameter of the beam spot of the bundle of rays incident on the fly-eye lens (in FIG. 2, for example, the entrance pupil diameter of the optical system from the fly-eye lens 13 to the channel condenser lens 16 is approximately equal to the diameter of the beam spot of the bundle of rays from the reflector 12 in FIG. 1A). However, the present invention is not limited thereto, and the entrance pupil diameter of this optical system may be approximately equal to the diameter of the beam spot (in FIG. 2, the entrance pupil diameter of the optical system from the fly-eye lens 13 to the channel condenser lens 16 may be made approximately equal to the diameter of the beam spot of the bundle of rays from the elliptic reflector 1).

Thus, the lighting optical unit of the liquid-crystal projector using the liquid-crystal panel with ML can further be made compact. (However, when the liquid-crystal projector using the liquid-crystal panel with ML and the liquid-crystal projector using the liquid-crystal panel without ML are both manufactured, the optical system from the fly-eye lens to the channel condenser lens in the lighting optical units cannot be made common.)

While the concave lens is employed in order to collimate converged light from the reflector into a bundle of approximately parallel rays in the embodiments of FIGS. 2, 8, 12, the present invention is not limited thereto, and other optical assembly other than the concave lens that can diverge incident light may be employed (e.g. holographic element).

While the position of the vertex of the lens cell of the first fly-eye lens of the lighting optical unit is deviated in the examples of FIGS. 8 and 12, the present invention is not limited thereto and the position of the vertex of the lens cell of the first fly-eye lens in the lighting optical units shown in FIGS. 4 and 6 may be deviated similarly.

Although the embodiment of FIG. 12 assumes that the concave lens 2 has the aberration, even when the concave lens 2 has no aberration and even when the lighting optical unit does not include the optical assembly such as the concave lens 2 that diverges incident light, the position of the vertex of the lens cell of the first fly-eye lens may be deviated in such a manner that the direction of light from the lens cell may be directed toward the opening portion of the polarizing transducer element.

While in FIG. 15 the manufacturing method is so far explained with reference to the lighting optical unit shown in FIG. 2 as an example, with respect to the lighting optical units shown in FIGS. 8 and 12, when the liquid-crystal projector using the liquid-crystal panel with ML and the liquid-crystal projector using the liquid-crystal panel without ML are both manufactured, similarly to FIG. 15, in the assembling operation of the lighting optical unit the arrangement operation of the optical system from the fly-eye lens 14 to the channel condenser lens 16 may be made common to both the projectors.

Alternatively, when light from the light-source lamp 11 becomes a bundle of parallel rays whose parallelism is not sufficiently high due to the aberration of the reflector 12 in the lighting optical unit shown in FIG. 1A, with respect to the lighting optical units shown in FIGS. 8 and 12, when the liquid-crystal projector using the liquid-crystal panel with ML and the liquid-crystal projector using the liquid-crystal panel without ML are both manufactured, in the assembling operation of lighting optical unit the arrangement operation of the optical system from the fly-eye lenses 51 and 52 to the channel condenser lens 16 may be made common to both the projectors.

In the above-mentioned embodiments, the present invention is applied to the liquid-crystal projector provided with the lighting optical unit including the optical system from the fly-eye lens to the channel condenser lens. However, the present invention is not limited thereto, and may be applied to a lighting optical unit including an optical system from an integrator comprising optical assemblies other than the fly-eye lens (e.g. diffraction type integrator) to the channel condenser lens. Further, the first lighting optical unit and liquid-crystal projector according to the present invention may be applied to a liquid-crystal projector including a lighting optical unit without an integrator.

While the present invention is applied to the liquid-crystal projectors in the above-mentioned embodiments, the first and second lighting optical units according to the present invention may be applied to a projector using a light modulator other than the liquid-crystal panel and may also be applied to other devices than the projectors, which may include the lighting optical units.

The present invention is not limited to the above-mentioned embodiments and may of course take various modifications without departing from the gist of the present invention.

As described above, in the first lighting optical unit according to the present invention, with respect to an object irradiated with light, since the apparent numerical aperture of the optical system for irradiating light from the light-source lamp on the object in a uniform and/or convergent manner can be reduced, the F number of this optical system can be made small to shorten the optical path length of the lighting optical unit when the maximum conical angle of incident light with respect to the object is required to be small.

When the lighting optical unit that needs the small maximum conical angle of the incident light for the object and the lighting optical unit that needs the large maximum conical angle of the incident light for the object are both manufactured, only the optical system including the large numerical apertures needs to be designed and manufactured, and the system can be made common to both the lighting optical units.

Next, according to the second lighting optical unit of the present invention, the optical path length can be shortened and the optical system can be made common similarly to the first lighting optical unit according to the present invention. Moreover, decrease in an amount of light irradiated on the object due to the aberration of the optical assembly that diverges the converged light is prevented without increasing the number of optical assemblies and without increasing the outside dimension of the lighting optical unit, whereby the efficiency in utilizing light from the light-source lamp can be enhanced.

Next, according to the first liquid-crystal projector of the invention, in the liquid-crystal projector using the transmission type liquid-crystal panel with the micro-lens, while the demand for increasing the quantity of light incident on the effective area of the pixel of the liquid-crystal panel is being satisfied, the outside dimension of the lighting optical unit can be reduced (accordingly, the whole of the liquid-crystal projector can be made small) by shortening the optical path length of the lighting optical unit.

Further, when the liquid-crystal projector using the transmission type liquid-crystal panel with the micro-lens and the liquid-crystal projector using the transmission type liquid-crystal panel without the micro-lens are both manufactured, since the optical system for irradiating light from the light-source lamp in the lighting optical unit in a uniform and/or convergent manner can be made common to both the projectors, costs of assemblies can be reduced.

Next, according to the second liquid-crystal projector of the present invention, in exactly the same manner as that of the first liquid-crystal projector according to the present invention, the optical path length of the lighting optical unit can be shortened and the optical system can be made common. Moreover, decrease in a quantity of light irradiated on the object due to the aberration of the optical assembly that diverges the converged light is prevented without increasing the number of optical assemblies and without increasing the outside dimension of the lighting optical unit (accordingly, without causing the whole of the liquid-crystal projector to become large in size), whereby the efficiency in utilizing light from the light-source lamp can be enhanced.

Next, according to the liquid-crystal projector manufacturing method of the present invention, when the liquid-crystal projector using the transmission type liquid-crystal panel with the micro-lens and the liquid-crystal projector using the transmission type liquid-crystal panel without the micro-lens are manufactured, in the assembling operation of the lighting optical unit the arrangement operation of the optical system for irradiating light from the light-source lamp on the liquid-crystal panel in a uniform and/or convergent manner can be made common to both the projectors, whereby the manufacturing operation can be made efficient.

The invention claimed is:

1. A lighting optical unit including an optical system having first and second fly-eye lenses for uniformly irradiating light from a light-source lamp on a predetermined object, the lighting optical unit comprising:
   a reflector for reflecting light from said light-source lamp to provide converged light; and
   an optical assembly for diverging said converged light, wherein diverged light with respect to an optical axis of the optical unit from said optical assembly is made to enter said optical system and a vertex position of a lens cell of said first fly-eye lens is deviated from a center of an opening of said lens cell such that the vertex position of the lens cell is eccentric with respect to the optical axis of the optical unit so as to correct a direction of the light from said optical assembly being approximately parallel to the optical axis of the optical unit and the approximately parallel light from the lens cell of the first fly-eye lens is made to enter corresponding lens cell of the second fly-eye lens.

2. A lighting optical unit according to claim 1, wherein said optical assembly comprises a double concave lens.

3. A lighting optical unit according to claim 1, wherein said optical system has an entrance pupil diameter essentially equal to a diameter of a beam spot of said bundle of approximately parallel rays.

4. A lighting optical unit according to claim 3, wherein said optical system comprises at least one fly-eye lens comprising a plurality of individual lenses having a diameter, the diameter of said bundle of approximately parallel rays being approximately equal to an even number multiple of the diameter of the plurality of individual lenses.

5. A lighting optical unit according to claim 1, wherein said first fly-eye lens is deviated diagonally from the center of the opening of said lens cell.

6. A lighting optical unit according to claim 1, wherein deviation of the vertex position in a lens cell near an outer edge of said fly-eye lens deviates an amount larger than deviation of the vertex position in a lens cell near a central portion of said fly-eye lens.

7. A liquid-crystal projector including:
   a light-source lamp;
   a transmission type liquid-crystal panel provided with micro-lenses corresponding to individual pixels; and
   a lighting optical unit including an optical system having first and second fly-eye lenses for uniformly irradiating light from said light-source lamp on the liquid-crystal panel, the liquid-crystal projector comprising:
   a reflector for reflecting light from said light-source lamp to provide converged light; and
   an optical assembly for diverging said converged light, wherein diverged light with respect to an optical axis of the optical unit from said optical assembly is made to enter said optical system and a vertex position of a lens cell of said first fly-eye lens is deviated from a center of an opening of said lens cell such that the vertex position of the lens cell is eccentric with respect to an optical axis of the optical unit so as to correct a direction of the light from said optical assembly being approximately parallel to the optical axis of the optical unit and the approximately parallel light from the lens cell of first fly-eye lens is made to enter corresponding lens cell of second fly-eye lens;

whereby refracted light provided with the micro-lens of the liquid-crystal panel is prevented from entering portions other than an effective area of the pixel.

8. A method of manufacturing a liquid-crystal projector comprising the steps of:

disposing an optical system having a numerical aperture through which a quantity of light incident on an effective area of pixel of a transmission type liquid-crystal panel without micro-lens becomes approximately maximum as an optical system in a lighting optical unit for irradiating light from a light-source lamp on a predetermined object in a uniform and/or convergent manner, wherein said optical system has an optical path length for use in irradiating both a liquid-crystal projection panel having micro-lenses and a liquid-crystal projection panel without micro-lenses so as to correct a direction of the light from said optical assembly being substantially parallel to an optical axis of the optical unit;

disposing a reflector for reflecting light from said light-source lamp to provide converged light and an optical assembly for collimating converged light from said reflector to provide a bundle of approximately parallel rays so that the bundle of approximately parallel ray is made to enter said optical system when a transmission type liquid-crystal panel with micro-lenses corresponding to individual pixels is used; and disposing a reflector for reflecting light from said light-source lamp to provide a bundle of approximately parallel rays so that the bundle of approximately parallel rays is made to enter said optical system when a transmission type liquid-crystal panel without micro-lens is used.

9. A liquid-crystal projector comprising:

a reflector for reflecting light from said light-source lamp to provide converged light; and an optical assembly for diverging said converged light, wherein diverged light with respect to an optical axis of the optical unit from said optical assembly is made to enter said optical system and a vertex position of a lens cell of said first fly-eye lens is deviated from a center of an opening of said lens cell such that the vertex position of the lens cell is eccentric with respect to the optical axis of the optical unit so as to correct a direction of the light from said optical assembly being approximately parallel to the optical axis of the optical unit and the approximately parallel light from the lens cell of the first fly-eye lens is made to enter corresponding lens cell of the second fly-eye lens.

* * * * *